United States Patent
Koga et al.

(10) Patent No.: US 11,496,013 B2
(45) Date of Patent: Nov. 8, 2022

(54) ROTATING ELECTRICAL MACHINE STATOR AND METHOD FOR MANUFACTURING ROTATING ELECTRICAL MACHINE STATOR

(71) Applicant: AISIN CORPORATION, Kariya (JP)

(72) Inventors: Kiyotaka Koga, Nishio (JP); Tomotsugu Sugihara, Okazaki (JP); Tetsuya Funayama, Okazaki (JP); Shinya Katayama, Nishio (JP); Takahiro Kobuchi, Kariya (JP)

(73) Assignee: AISIN CORPORATION, Kariya (JP)

( * ) Notice: Subject to any disclaimer, the term of this patent is extended or adjusted under 35 U.S.C. 154(b) by 178 days.

(21) Appl. No.: 16/967,352

(22) PCT Filed: Mar. 19, 2019

(86) PCT No.: PCT/JP2019/011359
§ 371 (c)(1),
(2) Date: Aug. 4, 2020

(87) PCT Pub. No.: WO2019/188554
PCT Pub. Date: Oct. 3, 2019

(65) Prior Publication Data
US 2021/0036569 A1 Feb. 4, 2021

(30) Foreign Application Priority Data

Mar. 26, 2018 (JP) .............................. JP2018-059004
Jul. 31, 2018 (JP) .............................. JP2018-144375

(51) Int. Cl.
*H02K 3/04* (2006.01)
*H02K 3/34* (2006.01)
(Continued)

(52) U.S. Cl.
CPC .............. *H02K 3/345* (2013.01); *H02K 3/04* (2013.01); *H02K 3/30* (2013.01); *H02K 15/085* (2013.01); *H02K 15/12* (2013.01)

(58) Field of Classification Search
CPC .. H02K 3/12; H02K 3/50; H02K 3/14; H02K 3/28; H02K 3/04; H02K 23/32; H02K 23/30; H02K 23/28; H02K 1/26
See application file for complete search history.

(56) References Cited

U.S. PATENT DOCUMENTS

| | | | |
|---|---|---|---|
| 7,759,834 B2 * | 7/2010 | Onimaru | H02K 3/18 310/201 |
| 2012/0025660 A1 * | 2/2012 | Patel | H02K 15/064 310/201 |

(Continued)

FOREIGN PATENT DOCUMENTS

| | | |
|---|---|---|
| EP | 2 475 076 A1 | 7/2012 |
| JP | S55-29242 A | 3/1980 |

(Continued)

OTHER PUBLICATIONS

May 14, 2019 International Search Report issued in International Patent Application No. PCT/JP2019/011359.
(Continued)

*Primary Examiner* — Leda T Pham
(74) *Attorney, Agent, or Firm* — Oliff PLC

(57) ABSTRACT

A rotating electrical machine stator and a method for manufacturing a rotating electrical machine stator with high productivity. A rotating electrical machine stator includes a stator core having a slot; and a coil having a leg part including a held-in-slot part held in the slot and a portion extending from the held-in-slot part, and a resin foam is provided between an inner surface of the slot and an outer surface of the held-in-slot part facing the inner surface of the slot. The coil is formed by joining together a plurality of (Continued)

segment conductors each having a joint part, and a conductive joint material is disposed between a pair of joint parts facing each other in the slot.

15 Claims, 19 Drawing Sheets

(51) Int. Cl.
*H02K 3/30* (2006.01)
*H02K 15/085* (2006.01)
*H02K 15/12* (2006.01)

(56) References Cited

U.S. PATENT DOCUMENTS

2012/0161568 A1* 6/2012 Umemoto ............... H02K 55/04
310/198
2012/0293037 A1* 11/2012 Uchida ................. H02K 3/487
310/214
2013/0300248 A1* 11/2013 Ishida ................. H02K 15/105
310/214

FOREIGN PATENT DOCUMENTS

| JP | 2003-116241 A | 4/2003 |
| JP | 2006-141076 A | 6/2006 |
| JP | 2011-244596 A | 12/2011 |
| JP | 2013-031254 A | 2/2013 |
| JP | 2015-082868 A | 4/2015 |
| WO | 2015/011542 A2 | 1/2015 |

OTHER PUBLICATIONS

Feb. 17, 2021 Search Report issued in European Patent Application No. 19776079.6.

* cited by examiner

ROTATING ELECTRICAL MACHINE STATOR AND METHOD FOR MANUFACTURING ROTATING ELECTRICAL MACHINE STATOR

TECHNICAL FIELD

Aspects of preferred embodiments relate to a rotating electrical machine stator and a method for manufacturing a rotating electrical machine stator.

BACKGROUND ART

For example, the following Patent Literature 1 (JP 2013-31254 A) discloses a method for manufacturing a stator in which fixing of coils (3) to a stator core (2) is performed using varnish. In Patent Literature 1, after installing a coil (3) in the stator core (2), varnish impregnated into the coil (3) is cured by heat, by which the coil (3) is fixed to the stator core (2).

CITATIONS LIST

Patent Literature

Patent Literature 1: JP 2013-31254 A

SUMMARY

Technical Problems

Meanwhile, in a technique such as that of Patent Literature 1, fixing to the stator core is performed by curing impregnated varnish by heat, and thus, a special step for curing is required, causing a problem of deterioration in productivity.

Hence, implementation of a rotating electrical machine stator and a method for manufacturing a rotating electrical machine stator with high productivity is desired.

Solutions to Problems

A characteristic configuration of a method for manufacturing a rotating electrical machine stator according to the present disclosure is that in a method for manufacturing a rotating electrical machine stator including a stator core having a slot; and a coil having a leg part including a held-in-slot part held in the slot and a portion extending from the held-in-slot part, the coil is formed by joining a plurality of segment conductors together, the leg parts of the plurality of segment conductors each are provided with a joint part that is joined to another one of the segment conductors with a conductive joint material that joins by heating, and the method includes:

a resin disposition step of disposing a resin foam being before foaming on at least either one of an inner surface of the slot and an outer surface of the held-in-slot part facing the inner surface of the slot;

a held-in-slot part disposition step of disposing a plurality of the held-in-slot parts in the slot such that a pair of the joint parts to be joined together face each other and the conductive joint material is disposed between the pair of the joint parts facing each other; and a heating step of heating the resin foam and the conductive joint material after the held-in-slot part disposition step, to foam the resin foam and join the pair of the joint parts together with the conductive joint material.

According to this method, joining together of a pair of joint parts for joining a plurality of segment conductors together with a conductive joint material can be performed in a heating step for heating and foaming a resin foam. Therefore, an increase in the number of manufacturing steps for a rotating electrical machine stator can be suppressed to a low level, enabling to implement the rotating electrical machine stator with high productivity.

A characteristic configuration of a rotating electrical machine stator according to the present disclosure is that in a rotating electrical machine stator including: a stator core having a slot; and a coil having a leg part including a held-in-slot part held in the slot and a portion extending from the held-in-slot part, a resin foam including a thermal expansion material is provided between an inner surface of the slot and an outer surface of the held-in-slot part facing the inner surface of the slot, the coil is formed by joining a plurality of segment conductors together, the leg parts of the plurality of segment conductors each are provided with a joint part that is joined to another one of the segment conductors, and a conductive joint material containing a metallic particle is disposed between a pair of the joint parts facing each other.

According to this configuration, joining together of a pair of joint parts for joining a plurality of segment conductors together with a conductive joint material can be performed using heating for foaming a resin foam. Therefore, an increase in the number of manufacturing steps for a rotating electrical machine stator can be suppressed to a low level, enabling to implement the rotating electrical machine stator with high productivity.

Further features and advantages of a technique according to the present disclosure will become more apparent by the following description of illustrative and non-restrictive embodiments which will be described with reference to drawings.

DESCRIPTION OF EMBODIMENTS

1. First Embodiment 1-1. Configuration of a Rotating Electrical Machine Stator A rotating electrical machine stator 1 (hereinafter, simply referred to as stator 1) according to a first embodiment will be described with reference to the drawings. Here, a case in which the stator 1 is applied to an inner-rotor rotating electrical machine 100 will be described as an example.

In the following description, an "axial direction X", a "radial direction Y", and a "circumferential direction Z" are defined with reference to the axial center of a cylindrical core reference plane S (see FIGS. 1 and 2), except where particularly specified separately. A "first radial side Y1" indicates an inner side in the radial direction Y and a "second radial side Y2" indicates an outer side in the radial direction Y. A "first circumferential side Z1" indicates one side in the circumferential direction Z (a counterclockwise side in an example shown in FIG. 2) and a "second circumferential side Z2" indicates the other side in the circumferential direction Z (a clockwise side in the example shown in FIG. 2).

In this specification, disposition directions of each part included in the stator 1 are described using the axial direction X, the radial direction Y, and the circumferential direction Z, assuming a state in which the stator 1 is disposed in the rotating electrical machine 100. In addition, in this specification, terms related to the dimensions, disposition directions, disposition locations, etc., of each member are used based on a concept that the terms also include a state of having differences by errors (a manufacturing-allowable level of errors).

Figure 1:
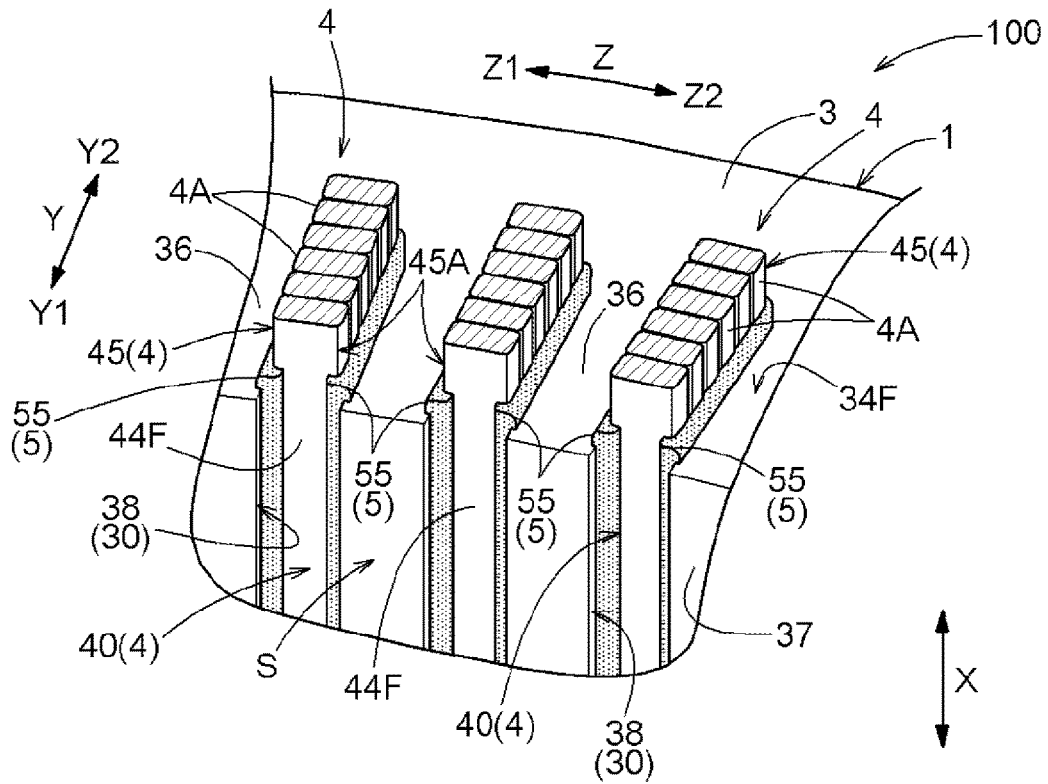
FIG. 1 is a perspective view of a part of a rotating electrical machine stator.
Figure 2:
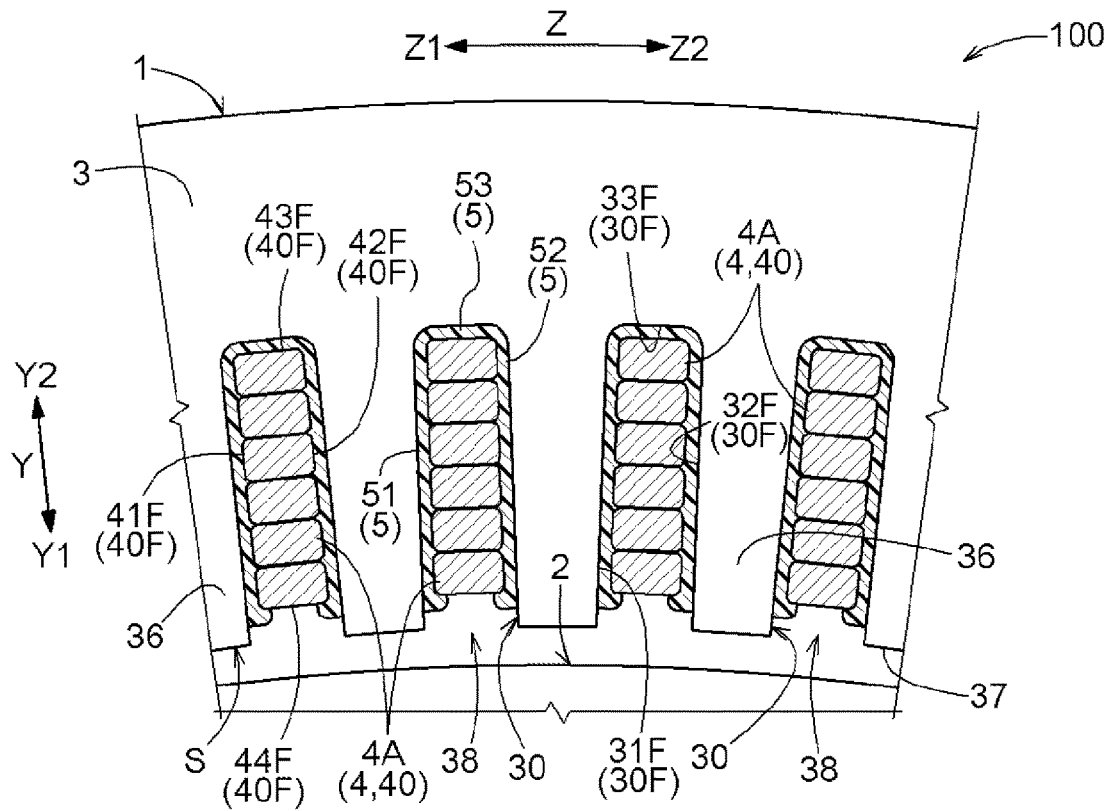
FIG. 2 is a cross-sectional view of a part of the rotating electrical machine stator.

As shown in FIGS. 1 and 2, the rotating electrical machine 100 includes the stator 1 and a rotating electrical machine rotor 2 (hereinafter, simply referred to as rotor 2) which is rotatably provided on the first radial side Y1 of the stator 1 (in this example, the inner side in the radial direction Y).

The stator 1 includes a stator core 3 having slots 30; and coils 4 having held-in-slot parts 40 which are held in the slots 30. The stator core 3 is formed by stacking electromagnetic steel sheets of a magnetic material on top of each other in the axial direction X. The coils 4 are formed using a material having conductivity (e.g., metals such as copper and aluminum). In FIG. 1, for simplification's sake, the coils 4 are shown partially omitted such that the most part of coil end parts 45 protruding in the axial direction X from the stator core 3 is cut off. The rotating electrical machine 100 is, for example, the rotating electrical machine 100 driven by three-phase alternating current.

The plurality of slots 30 are arranged in the stator core 3 in a distributed manner at a certain spacing in the circumferential direction Z. The slots 30 are formed so as to extend in the axial direction X and the radial direction Y (radially), and pass through the stator core 3 in the axial direction X. A tooth 36 is formed between two slots 30 adjacent to each other in the circumferential direction Z.

In the present embodiment, each slot 30 has an opening part 38 that opens toward a side of the slot 30 facing the rotor 2 (in this example, the first radial side Y1). In the example shown in the drawings, the opening part 38 is an end-part region on the first radial side Y1 of the slot 30, and is formed between tip parts (end parts on the first radial side Y1) of two teeth 36 adjacent to each other in the circumferential direction Z.

Note that the above-described "cylindrical core reference plane S" is an imaginary reference plane for the arrangement and configuration of the slots 30. In the present embodiment, a cylindrical imaginary plane (core inner circumferential plane) including end surfaces 37 on the first radial side Y1 of the plurality of teeth 36 (the number of which is the same as that of the slots 30) serves as the core reference plane S. Note, however, that the core reference plane S is not limited thereto, and a plane on the second radial side Y2 of the stator core 3 (core outer circumferential plane), etc., may serve as the core reference plane S.

Each coil 4 is composed of a plurality of conductor wires 4A, and is partially inserted in a slot 30 and wound around the stator core 3. In the present embodiment, in a slot 30, a plurality of conductor wires 4A (in this example, six conductor wires 4A) are arranged side by side in the radial direction Y. Here, the plurality of conductor wires 4A in the slot 30 are in contact with each other in the radial direction Y. Note that the coil 4 may be such that multiple conductor wires 4A having a smaller cross-section area than that in the example shown in the drawings are irregularly arranged in the slot 30.

As shown in FIG. 1, a coil 4 has a held-in-slot part 40 disposed in a slot 30; and a coil end part 45 disposed outside the slot 30. In the present embodiment, with reference to an axial end surface 34F which is a surface formed at an end part in the axial direction X of the stator core 3, a portion of the coil 4 disposed more on the inner side in the axial direction X than the axial end surface 34F is the held-in-slot part 40, and a portion of the coil 4 disposed more on the outer side in the axial direction X than the axial end surface 34F is the coil end part 45. The held-in-slot part 40 includes a plurality of conductor wires 4A disposed in the slot 30, and the coil end part 45 includes a plurality of conductor wires 4A disposed outside the slot 30.

As shown in FIG. 2, a held-in-slot part 40 is disposed in a slot 30, with an inner surface 30F of the slot 30 facing an outer surface 40F of the held-in-slot part 40. In the present embodiment, the inner surface 30F of the slot 30 and the outer surface 40F of the held-in-slot part 40 face each other in the entire region in the axial direction X where the slot 30 is present.

The inner surface 30F of the slot 30 includes a first inner surface part 31F and a second inner surface part 32F that extend in the radial direction Y; and a connecting inner surface part 33F that connects the first inner surface part 31F to the second inner surface part 32F and extends in the circumferential direction Z. The first inner surface part 31F and the second inner surface part 32F face each other in the circumferential direction Z. Of these inner surface parts 31F and 32F facing each other in the circumferential direction Z, the first inner surface part 31F is disposed on the first circumferential side Z1, and the second inner surface part 32F is disposed on the second circumferential side Z2. The connecting inner surface part 33F is disposed in an end-part region on the second radial side Y2 of the slot 30, and connects end parts on the second radial side Y2 of the respective first inner surface part 31F and second inner surface part 32F.

The outer surface 40F of the held-in-slot part 40 includes a first outer surface part 41F and a second outer surface part 42F that extend in the radial direction Y; and a connecting outer surface part 43F and a rotor-side outer surface part 44F that connect the first outer surface part 41F to the second outer surface part 42F and extend in the circumferential direction Z. The first outer surface part 41F and the second outer surface part 42F lie side by side in the circumferential direction Z. Of these outer surface parts 41F and 42F lying side by side in the circumferential direction Z, the first outer surface part 41F is disposed on the first circumferential side Z1, and the second outer surface part 42F is disposed on the second circumferential side Z2. The connecting outer surface part 43F and the rotor-side outer surface part 44F lie side by side in the radial direction Y. Of these outer surface parts 43F and 44F lying side by side in the radial direction Y, the connecting outer surface part 43F is disposed on the second radial side Y2, and connects end parts on the second radial side Y2 of the respective first outer surface part 41F and second outer surface part 42F. The rotor-side outer surface part 44F is disposed on the first radial side Y1, and connects end parts on the first radial side Y1 of the respective first outer surface part 41F and second outer surface part 42F. In this example, the rotor-side outer surface part 44F is disposed facing the rotor 2 with the opening part 38 present therebetween.

As shown in FIG. 2, the first inner surface part 31F and the first outer surface part 41F are disposed facing each other in the circumferential direction Z with a layer of a resin foam 5 sandwiched therebetween. Likewise, the second inner surface part 32F and the second outer surface part 42F are disposed facing each other in the circumferential direction Z with a layer of the resin foam 5 sandwiched therebetween. In addition, the connecting inner surface part 33F and the connecting outer surface part 43F are disposed facing each other in the radial direction Y with a layer of the resin foam 5 sandwiched therebetween.

Note that each of the inner surface parts 31F to 33F included in the slot 30 includes an uneven shape. Specifically, each of the inner surface parts 31F to 33F of the slot 30 is made up of a set of end surfaces of a plurality of electromagnetic steel sheets stacked on top of each other in the axial direction X. Thus, unevenness associated with the shape of an end surface of each electromagnetic steel sheet is formed on the inner surface 30F (each of the inner surface parts 31F to 33F) of the slot 30. In addition, each of the outer surface parts 41F to 44F included in the held-in-slot part 40 also includes an uneven shape. Specifically, the held-in-slot part 40 is made up of a set of a plurality of conductor wires 4A included in a coil 4. Thus, unevenness of each of such a plurality of conductor wires 4A included in the held-in-slot part 40 appears on the outer surface 40F (each of the outer surface parts 41F to 44F) of the held-in-slot part 40.

Meanwhile, conventionally, fixing of the coils 4 to the stator core 3 is performed by installing the coils 4 in the stator core 3, and then impregnating portions between the slots 30 and the held-in-slot parts 40 with varnish, and curing the varnish. In this case, however, it is difficult to achieve a uniform varnish impregnation state of the coils 4, and a portion with insufficient varnish impregnation has low fixing power of a corresponding coil 4 to the stator core 3. Due to this, there has been a case in which the fixing power of the coils 4 to the stator core 3 is non-uniform depending on the location.

Hence, as shown in FIGS. 1 and 2, in the rotating electrical machine stator 1, a resin foam 5 is provided between an inner surface 30F of a slot 30 and an outer surface 40F of a held-in-slot part 40 facing the inner surface 30F of the slot 30. The resin foam 5 includes a thermal expansion material. The resin foam 5 can be foamed and expanded in a foaming step such as heating.

Figure 3:
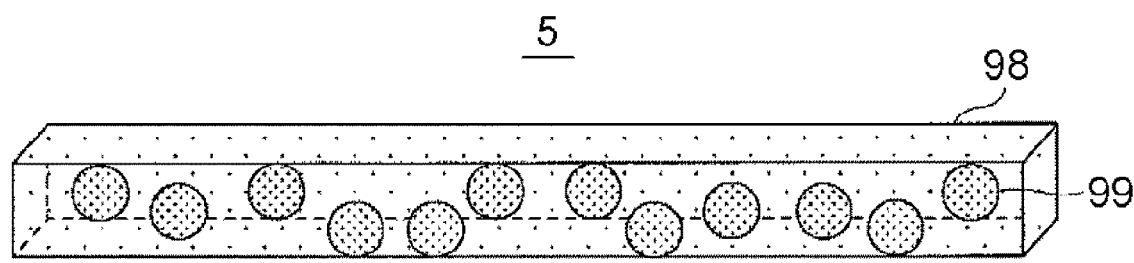
FIG. 3 is an illustrative diagram showing an example of a structure of a resin foam.
Figure 4:
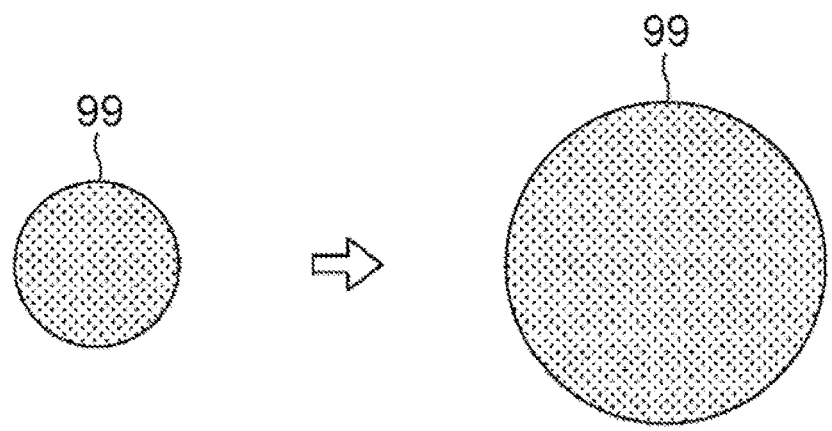
FIG. 4 is a diagram conceptually showing the states of a capsule material before and after expansion by heating.

In the present embodiment, for the resin foam 5, a material that expands under a predetermined condition is used. For example, as shown in FIGS. 3 and 4, the resin foam 5 is made of a resin having mixed therein a material that expands by heating and having adhesion properties. Note that FIG. 3 is an illustrative diagram of a structure of the resin foam 5, and is a perspective view conceptually showing the resin foam 5 before heating. FIG. 4 is a diagram conceptually showing the states of a capsule material 99 before and after expansion by heating, the capsule material 99 being an example of the material that expands by heating.

In an example shown in FIG. 3, the resin foam 5 is an epoxy resin 98 having mixed therein multiple capsule materials 99 that expand by heating. The capsule material 99 expands by being heated as shown on the right in FIG. 4 from a state before heating shown on the left in FIG. 4. As a result, the entire resin foam 5 expands by heating. Note that the capsule materials 99 remain expanded in the resin foam 5 even after the resin foam 5 is cured after heating.

For example, using a resin foam 5 having such a configuration, the resin foam 5 being before foaming is provided between an inner surface 30F of a slot 30 and an outer surface 40F of a held-in-slot part 40, and is then foamed, by which the resin foam 5 spreads to necessary locations between the inner surface 30F of the slot 30 and the outer surface 40F of the held-in-slot part 40, enabling to provide the resin foam 5 at the necessary locations in a close-to-uniform state.

Namely, it is easy to manage the state of the resin foam 5 compared to varnish impregnation. This can suppress the fixing power of a coil 4 to the stator core 3 from becoming non-uniform depending on the location.

In addition, by using such a resin foam 5, a coil 4 can be fixed to the stator core 3, with a slot 30 and a held-in-slot part 40 being spaced apart from each other. Hence, electrical insulation properties between the stator core 3 and the coil 4 can also be secured. Note that FIG. 5 shows the states of a resin foam 5 in a slot 30 before foaming (a state on the left) and after foaming (a state on the right).

In the present embodiment, the entire region of an outer surface 40F of a held-in-slot part 40 facing an inner surface 30F of a slot 30 is covered by a resin foam 5. In the example shown in FIG. 2, a resin foam 5 includes a first resin part 51 formed between a first inner surface part 31F and a first outer surface part 41F; a second resin part 52 formed between a second inner surface part 32F and a second outer surface part 42F; and a connecting resin part 53 formed between a connecting inner surface part 33F and a connecting outer surface part 43F. Furthermore, the first resin part 51, the second resin part 52, and the connecting resin part 53 are formed over the entire region in the axial direction X where the slot 30 is present. By this, the fixing power of the coil 4 to the stator core 3 and electrical insulation properties can be highly reliably secured.

Figure 5:
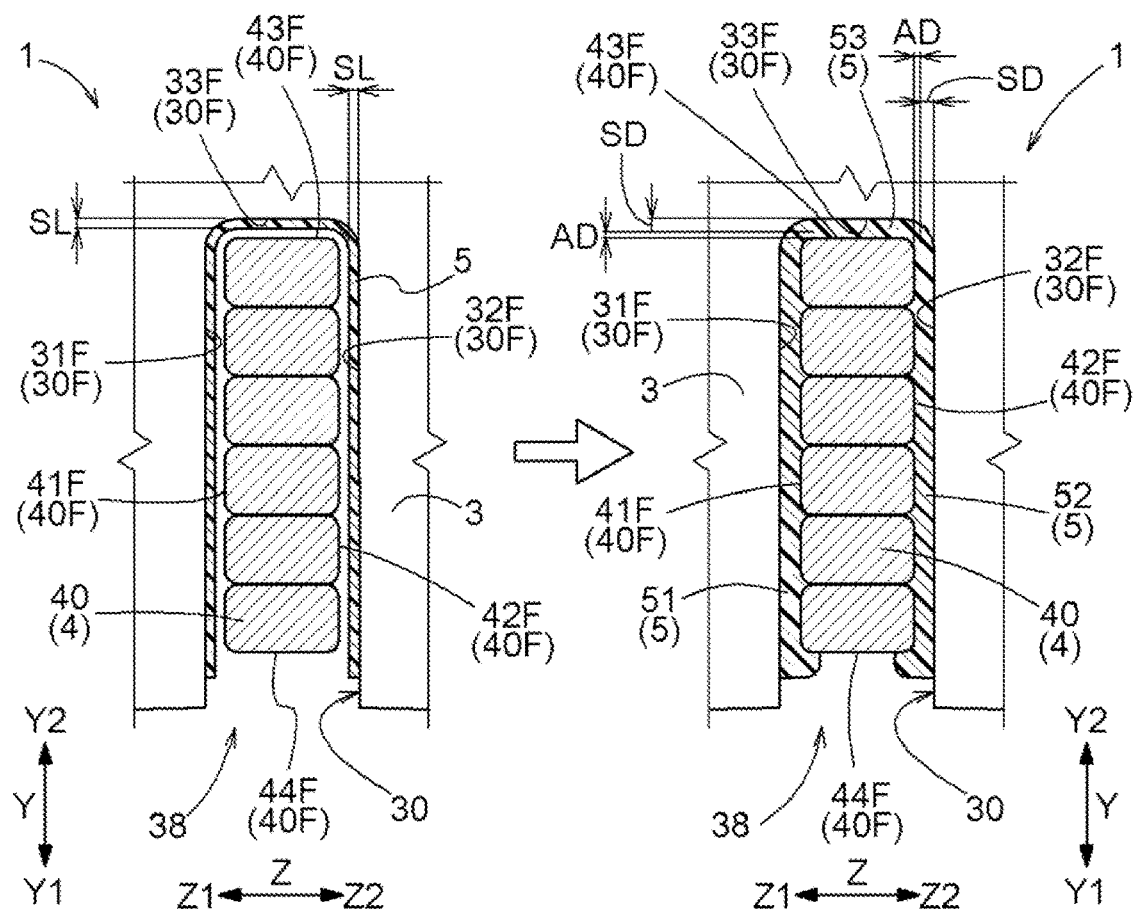
FIG. 5 is a diagram showing before and after the resin foam is foamed.

As shown in FIG. 5, in the present embodiment, the distance between the inner surface 30F of the slot 30 and the outer surface 40F of the held-in-slot part 40 which are spaced apart from each other by the resin foam 5 is greater than or equal to a specified insulation distance SD (see a state on the right in FIG. 5). Here, the "insulation distance" indicates a minimum distance set to secure electrical insulation properties required between the inner surface 30F of the slot 30 and the outer surface 40F of the held-in-slot part 40. In the present embodiment, as shown in FIG. 5, a design distance between the inner surface 30F of the slot 30 and the outer surface 40F of the held-in-slot part 40 is set to be a distance obtained by adding an allowable amount of position displacement AD of the held-in-slot part 40 to the insulation distance SD. Here, it is preferred that the "allowable amount of position displacement" be set to a value larger than a maximum value of a disposition error of the held-in-slot part 40 with respect to the slot 30. By doing so, regardless of a disposition error of the held-in-slot part 40, a necessary insulation distance SD can be secured. Note that factors that cause a disposition error of the held-in-slot part 40 include, for example, a positioning error of a jig for disposing the held-in-slot part 40 in the slot 30, an error in the thickness of a coating of the resin foam 5 being before foaming, and an error in the foaming factor of the resin foam 5.

In addition, in the present embodiment, the distance between the inner surface 30F of the slot 30 and the outer surface 40F of the held-in-slot part 40 is designed to be the same all around the entire circumference, excluding the first radial side Y1 of the held-in-slot part 40 as viewed in the axial direction X. In other words, the first resin part 51, the second resin part 52, and the connecting resin part 53 have the same design thickness. By this, regardless of the direction of displacement of a disposition position of the held-in-slot part 40 with respect to the slot 30, the specified insulation distance SD can be secured. By the above, electrical insulation properties between the inner surface 30F of the slot 30 and the outer surface 40F of the held-in-slot part 40 can be highly reliably secured. Note that it is preferred that the insulation distance SD be determined based on a maximum value of voltage applied to the coil 4, insulation characteristics of the resin foam 5, etc. By using a material with high electrical insulation performance for the resin foam 5, the insulation distance SD is reduced, enabling to increase the occupancy of the coil 4.

Figure 6:
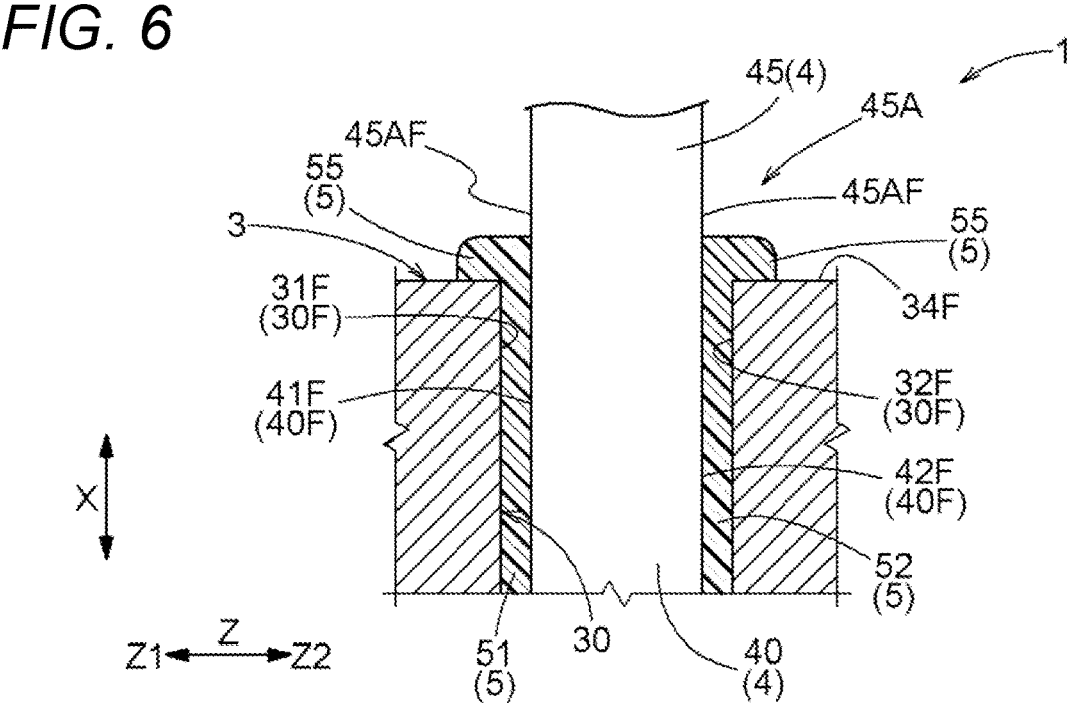
FIG. 6 is a diagram of a partial cross-section of the rotating electrical machine stator as viewed from a radial inner side to a radial outer side.

Furthermore, in the present embodiment, as shown in FIG. 6, the resin foam 5 is also provided between an outer surface 45AF of a protruding portion 45A of the coil end part 45 that protrudes from the slot 30 and the end surface 34F of the stator core 3 facing the protruding portion 45A. In the present embodiment, since the stator 1 is applied to the radial-gap rotating electrical machine 100, the coil end part 45 protrudes outward from an end-part region in the axial direction X of the slot 30, in other words, an end part in the axial direction X of the stator core 3. In addition, the end surface 34F of the stator core 3 facing the protruding portion 45A of the coil end part 45 is an end surface of the stator core 3 facing in the axial direction X (hereinafter, referred to as axial end surface 34F). Here, the "protruding portion of the coil end part" indicates a portion of the coil end part 45 near the axial end surface 34F (a portion present in an area within a specified distance from the axial end surface 34F).

Namely, in the present embodiment, the resin foam 5 includes an outer resin part 55 formed outside the slot 30 of the stator core 3. In an example shown in FIGS. 1 and 6, the outer resin part 55 is provided so as to enclose an edge part of the slot 30 on the axial end surface 34F. By this, even on the outside of the slot 30, electrical insulation properties can be secured in a region in which the protruding portion 45A of the coil end part 45 and the axial end surface 34F of the stator core 3 are disposed close to each other.

Here, it is preferred that the design thickness in the circumferential direction Z, the radial direction Y, and the axial direction X of the outer resin part 55 be set such that as in the case of the inside of the slot 30, the distance between the axial end surface 34F of the stator core 3 and the protruding portion 45A of the coil end part 45 is greater than or equal to the insulation distance SD, more preferably, a distance obtained by adding the allowable amount of position displacement AD to the insulation distance SD. Note that the outer resin part 55 may be provided over a wider area on the axial end surface 34F (e.g., the entire axial end surface 34F) including an area near the edge part of the slot 30.

1-2. Method for Manufacturing a Rotating Electrical Machine Stator

Next, a method for manufacturing the rotating electrical machine stator 1 according to the first embodiment will be described.

Figure 7:
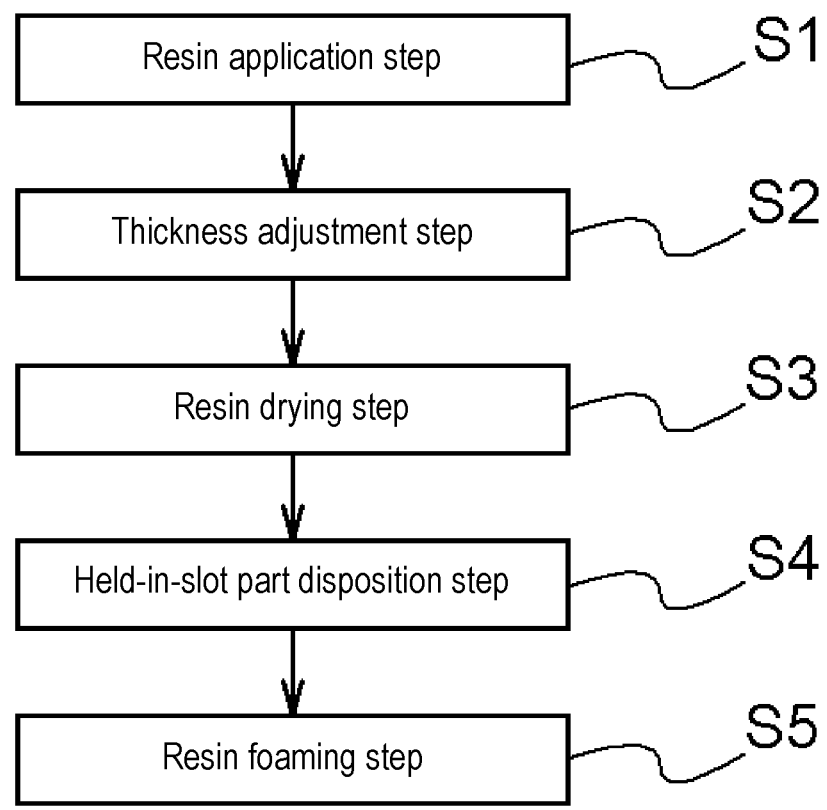
FIG. 7 is a flowchart showing manufacturing steps for the rotating electrical machine stator.

In the method for manufacturing the stator 1 according to the present embodiment, as shown in FIG. 7, a resin application step S1 serving as a resin disposition step, a thickness adjustment step S2, a resin drying step S3, a held-in-slot part disposition step S4, and a resin foaming step S5 by a heating step are performed in this order.

In the resin application step S1, a resin foam 5 being before foaming is disposed on at least either one of an inner surface 30F of a slot 30 and an outer surface 40F of a held-in-slot part 40 facing the inner surface 30F of the slot 30. In the present embodiment, by applying a resin foam 5 being before foaming, the resin foam 5 being before foaming is disposed on at least either one of the inner surface 30F and the outer surface 40F. By this, when the held-in-slot part 40 is disposed in the slot 30, the resin foam 5 can be provided between the inner surface 30F of the slot 30 and the outer surface 40F of the held-in-slot part 40.

In the present embodiment, the resin application step S1 is performed by applying a resin foam 5 being before foaming to the inner surface 30F of the slot 30 (see a diagram on the left in FIG. 5). According to this, since the resin foam 5 is applied to the inner surface 30F of the slot 30 having a fixed shape, compared with a case in which the resin foam 5 is applied to the outer surface 40F of the held-in-slot part 40 having a plurality of conductor wires 4A which are not fixed to each other, an operation in the resin application step S1 can be easily performed. Note, however, that the configuration is not limited thereto, and in the resin application step S1, the resin foam 5 may be applied to the outer surface 40F of the held-in-slot part 40 or may be applied to both the outer surface 40F of the held-in-slot part 40 and the inner surface 30F of the slot 30.

In addition, it is preferred that the resin application step S1 include a step of applying a resin foam 5 being before foaming to at least either one of an outer surface 45AF of a protruding portion 45A of a coil end part 45 that protrudes from the slot 30 and an axial end surface 34F of the stator core 3 facing the protruding portion 45A (see FIG. 6). In the present embodiment, the resin foam 5 being before foaming is applied so as to enclose an edge part of the slot 30 on the axial end surface 34F of the stator core 3. By this, after performing the resin foaming step S5, as shown in FIG. 6, an outer resin part 55 can be provided between the outer surface 45AF of the protruding portion 45A of the coil end part 45 and the end surface 34F of the stator core 3 facing the protruding portion 45A. Note that instead of applying the resin foam 5 to the axial end surface 34F of the stator core 3, for example, the resin foam 5 may be applied to the outer surface 45AF of the protruding portion 45A of the coil end part 45 or may be applied to both the outer surface 45AF of the protruding portion 45A of the coil end part 45 and the axial end surface 34F of the stator core 3.

In the present embodiment, after the resin application step S1, a thickness adjustment step S2 is performed. In the thickness adjustment step S2, as shown in a diagram on the left in FIG. 5, the thickness of the resin foam 5 being before foaming which is applied in the resin application step S1 is adjusted to a pre-specified thickness SL. The "pre-specified thickness" is set such that the thickness of the resin foam 5 being after foaming reaches a desired thickness. In an example shown in FIG. 5, the pre-specified thickness SL is set such that the thickness of the resin foam 5 being after foaming reaches a thickness determined based on a design distance between the outer surface 40F of the held-in-slot part 40 and the inner surface 30F of the slot 30 with the held-in-slot part 40 being disposed in the slot 30 (in this example, the insulation distance SD+the allowable amount of position displacement AD). For example, the "pre-specified thickness" is set based on the design distance between the outer surface 40F of the held-in-slot part 40 and the inner surface 30F of the slot 30, the expansion coefficient of the resin foam 5, an error in thickness adjustment in the thickness adjustment step S2, and the like.

In the present embodiment, the thickness adjustment step S2 is performed, for example, by removing a thicker portion than the specified thickness SL from the resin foam 5 being before foaming which is applied to the inner surface 30F of the slot 30, using a jig, etc. Note that when the resin foam 5 is applied so as to be thicker than the specified thickness SL in the resin application step S1 which is performed before the thickness adjustment step S2, such removable of the resin foam 5 can be ideally performed. By performing the thickness adjustment step S2 before the held-in-slot part disposition step S4, the thickness adjustment of the resin foam 5 can be easily performed with the held-in-slot part 40 being present outside the slot 30 (with the held-in-slot part 40 being not disposed in the slot 30). Note that the thickness adjustment step S2 may be simultaneously performed with the resin application step S1. In this case, for example, a resin foam 5 with the specified thickness SL may be provided on the inner surface 30F of the slot 30 by placing a mold that covers a location distanced by the specified thickness SL from the inner surface 30F of the slot 30, pouring a resin foam 5 into the mold, and then removing the mold.

In the present embodiment, after the thickness adjustment step S2, prior to the held-in-slot part disposition step S4, the resin drying step S3 is performed. In the resin drying step S3, the resin foam 5 being before foaming which is applied in the resin application step S1 is dried. In this example, in the resin drying step S3, by heating the resin foam 5 at a non-foaming temperature which is such a level of temperature that does not foam the resin foam 5, the resin foam 5 is dried. The resin foam 5 is in a soft state having viscosity before drying, but by heating the resin foam 5 at the non-foaming temperature, a solvent component is volatilized and the resin foam 5 is primarily cured. By this, even when the held-in-slot part 40 comes into contact with the resin foam 5 applied to the inner surface 30F of the slot 30 upon performing the held-in-slot part disposition step S4 which will be described later, the resin foam 5 can be suppressed from peeling off or being scraped off. Note that the thickness adjustment step S2 and the resin drying step S3 may be performed in reversal order. In this case, in the thickness adjustment step S2, for example, a method in which a surface of the resin foam 5 is pressed by a pressing mold such that the resin foam 5 having been primarily cured in the resin drying step S3 has the specified thickness SL is ideally used.

In the present embodiment, after the resin drying step S3, the held-in-slot part disposition step S4 is performed. In the held-in-slot part disposition step S4, the held-in-slot part 40 is disposed in the slot 30, with the resin foam 5 being before foaming applied to the inner surface 30F of the slot 30. As such, since the resin application step S1 is performed before the held-in-slot part disposition step S4, compared with a case in which after a held-in-slot part 40 is held in a slot 30, a resin foam 5 being before foaming is poured between the held-in-slot part 40 and the slot 30, it is easy to uniformly provide the resin foam 5 at necessary locations.

Then, after the held-in-slot part disposition step S4, the resin foaming step S5 in which the resin foam 5 is foamed by heating step of heating the resin foam 5 is performed. In the present embodiment, the resin foam 5 is allowed to expand by heating the resin foam 5 at a foaming temperature at which a foaming material of the resin foam 5 is foamed. By this, a portion between the inner surface of the slot 30 and the outer surface 40F of the held-in-slot part 40 can be filled with the foamed resin foam 5, and the fixing power of a coil 4 to the stator core 3 can be secured in a region in which the resin foam 5 is present. Furthermore, the inner surface 30F of the slot 30 and the outer surface 40F of the held-in-slot part 40 can also be electrically isolated from each other. As such, since the resin foaming step S5 is performed after the held-in-slot part disposition step S4, the resin foam 5 spreads to necessary locations between the inner surface 30F of the slot 30 and the outer surface 40F of the held-in-slot part 40, enabling to suppress non-uniformity of the presence of the resin foam 5 depending on the location to a low level. Therefore, non-uniformity of the fixing power of the coil 4 to the stator core 3 depending on the location can be reduced. Then, after the resin foam 5 is foamed, the resin foam 5 is further heated at a curing temperature and is thereby cured (main curing). In the present embodiment, in the resin foaming step S5, the entire stator core 3 is heated in a furnace to gradually increase the temperature of the resin foam 5, by which foaming and main curing are performed.

2. Second Embodiment

Next, a second embodiment of a rotating electrical machine stator 1 and a method for manufacturing the rotating electrical machine stator 1 will be described. The second embodiment differs from the above-described first embodiment mainly in the configuration of a coil 4 and the configuration of a resin foam 5. In addition, due to the differences in the configurations, a method for manufacturing the rotating electrical machine stator 1 also differs. In the following, the second embodiment will be described mainly about the differences from the first embodiment. Points that are not particularly described are the same as those of the above-described first embodiment.

2-1. Configuration of a Coil

Figure 8:
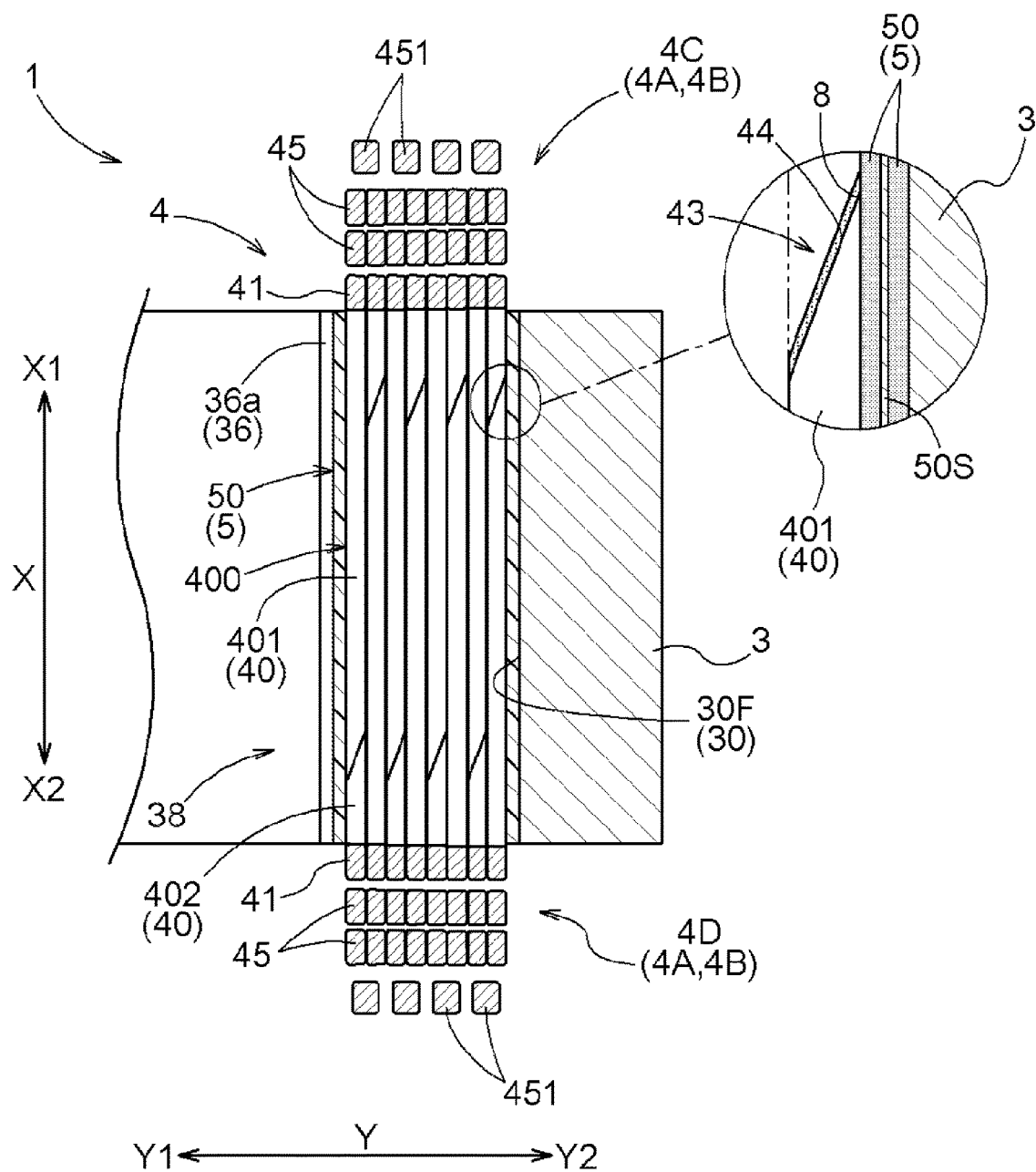
FIG. 8 is an axial cross-sectional view of a part of a rotating electrical machine stator according to a second embodiment.
Figure 9:
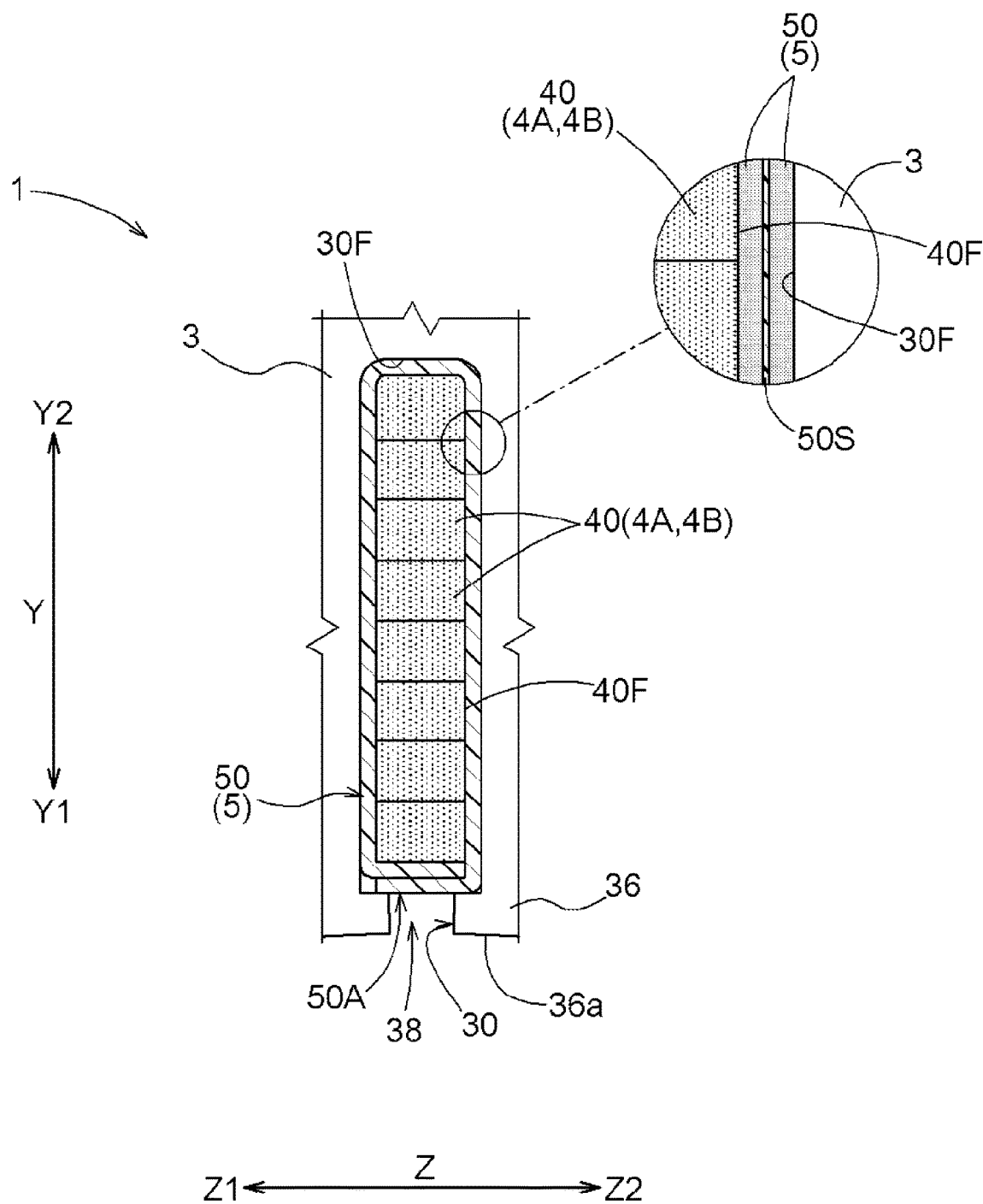
FIG. 9 is a radial cross-sectional view of a part of the rotating electrical machine stator according to the second embodiment.

A configuration of a coil 4 according to the present embodiment will be described. As shown in FIGS. 8 and 9, in a slot 30, a plurality of conductor wires 4A (in this example, eight conductor wires 4A) are arranged side by side in the radial direction Y. In the slot 30, a plurality of held-in-slot parts 40 are disposed. The coil 4 has leg parts 400 each including a held-in-slot part 40 which is held in the slot 30; and a portion extending from the held-in-slot part 40 (hereinafter, referred to as extending part 41.). The held-in-slot part 40 and the extending part 41 which are included in the leg part 400 continue with each other and extend in the same direction. In this example, the leg part 400 is linearly formed in a direction in which the slot 30 extends (here, the axial direction X).

In the present embodiment, the coil 4 is formed by joining a plurality of segment conductors 4B together. Each segment conductor 4B is formed of a linear conductor whose cross-sectional shape on a plane orthogonal to the extending direction is, for example, rectangular.

Figure 10:
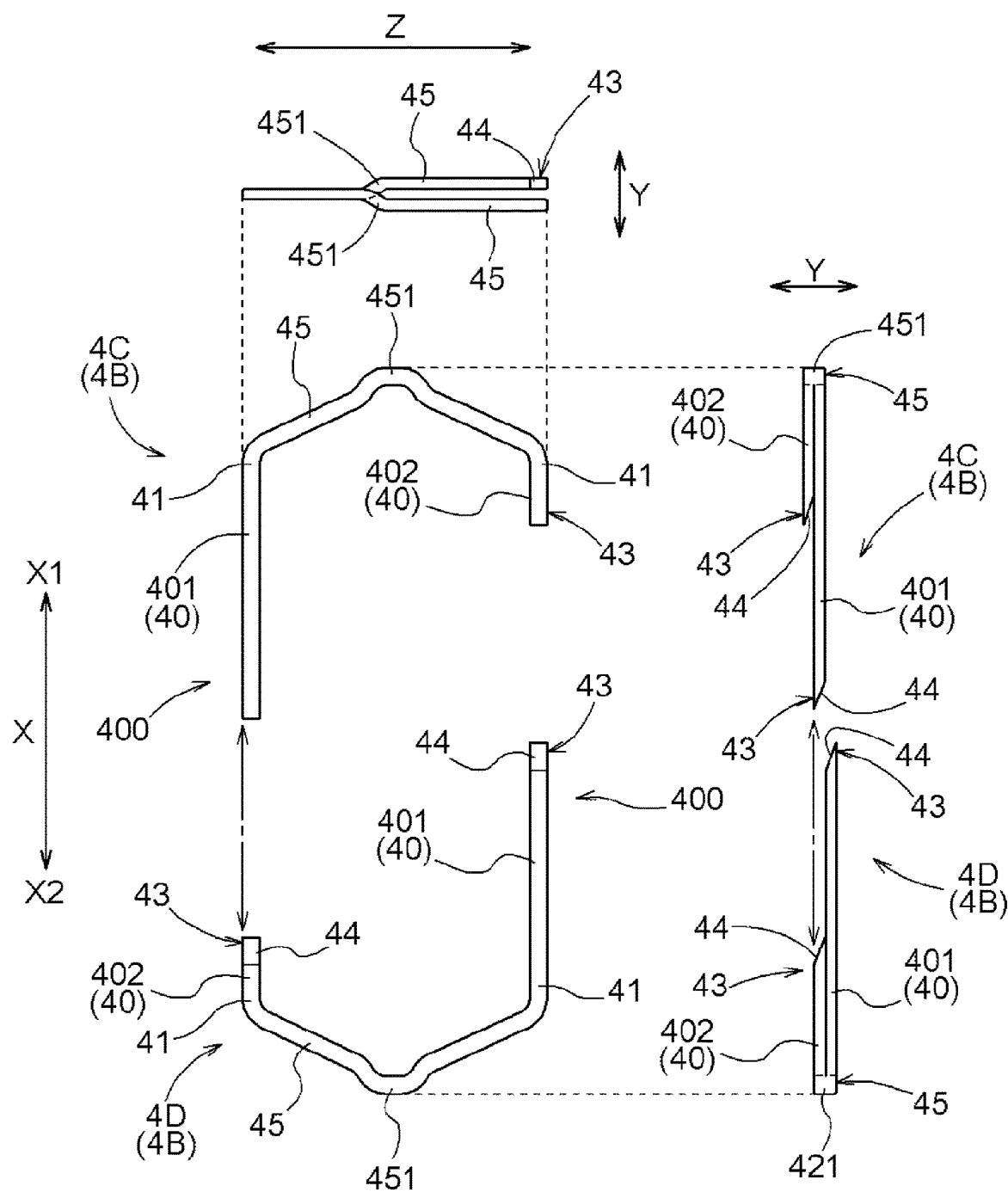
FIG. 10 is a diagram showing a pair of segment conductors used in the rotating electrical machine stator according to the second embodiment.

Here, a configuration of the segment conductor 4B will be described using FIG. 10. FIG. 10 is a diagram showing a pair of segment conductors 4B which are joined together, as viewed in the radial direction Y, the axial direction X, and the circumferential direction Z, and for convenience of description, a conductive joint material 8 which will be described later is omitted.

The lower left, top, and right in FIG. 10 respectively show a pair of segment conductors 4B as viewed in the radial direction Y, the axial direction X, and the circumferential direction Z.

Note that in the following description one side in the axial direction X (an upper side in an example shown in FIG. 10) is a first axial side X1, and the other side (a lower side in the example shown in FIG. 10) is a second axial side X2. A segment conductor 4B having a coil end part 45 disposed on the first axial side X1 of the stator core 3 is a first segment conductor 4C, and a segment conductor 4B having a coil end part 45 disposed on the second axial side X2 of the stator core 3 is a second segment conductor 4D. Note that in the following, when the segment conductor 4B is mentioned, it indicates both the first segment conductor 4C and the second segment conductor 4D without distinction.

As shown in FIG. 10, the segment conductor 4B is formed in U-shape as viewed in the radial direction Y.

The segment conductor 4B has a pair of held-in-slot parts 40 and a coil end part 45 that connects the pair of held-in-slot parts 40. In this example, the above-described leg part 400 includes the entire held-in-slot parts 40 and a part of the coil end part 45. In addition, the leg part 400 is linear portions of the segment conductor 4B that do not include bent portions of the coil end part 45. In the present embodiment, the lengths in the axial direction X of the pair of held-in-slot parts 40 differ from each other. Hence, in the following description, a held-in-slot part 40 which is one of the pair of held-in-slot parts 40 and has a larger length in the axial direction X than the other is a first held-in-slot part 401, and a held-in-slot part 40 smaller in length in the axial direction X than the first held-in-slot part 401 is a second held-in-slot part 402. Note that in the following, when the held-in-slot part 40 is mentioned, it indicates both the first held-in-slot part 401 and the second held-in-slot part 402 without distinction.

The leg parts 400 of the plurality of segment conductors 4B each are provided with joint parts 43, each of which is joined to another segment conductor 4B with a conductive joint material 8 that joins by heating. In the present embodiment, the held-in-slot part 40 of each of the plurality of segment conductors 4B is provided with a joint part 43 that is joined to another segment conductor 4B. In this example, the held-in-slot parts 40 of the first segment conductor 4C are provided with joint parts 43 that are joined to second segment conductors 4D, and the held-in-slot parts 40 of the second segment conductor 4D are provided with joint parts 43 that are joined to first segment conductors 4C.

As shown in FIGS. 8 and 10, each held-in-slot part 40 extends in the axial direction X in parallel to the slot 30, and has a joint part 43, which is joined to another held-in-slot part 40, formed at its tip part, i.e., an end part of the held-in-slot part 40 on an opposite side of its connecting part to the coil end part 45. A detailed configuration of the joint part 43 will be described later.

A coil end part 45 connects a pair of held-in-slot parts 40. In the present embodiment, a coil end part 45 of the first segment conductor 4C connects end parts on the first axial side X1 of a pair of held-in-slot parts 40 of the first segment conductor 4C, and a held-in-slot part 40 of the second segment conductor 4D connects end parts on the second axial side X2 of a pair of held-in-slot parts 40 of the second segment conductor 4D. Each coil end part 45 has an offset part 451 formed therein that allows a pair of held-in-slot parts 40 to be offset from each other in the radial direction Y. In the present embodiment, the offset part 451 is formed at a central part in the circumferential direction Z of the coil end part 45, and is formed so as to allow the pair of held-in-slot parts 40 to be offset from each other by one layer in the radial direction Y.

By having the offset part 451, the pair of held-in-slot parts 40 of the segment conductor 4B are adjacent to each other without overlapping as viewed in the circumferential direction Z.

Here, the "overlapping" indicates that for disposition of two members, when an imaginary straight line parallel to a line-of-sight direction is moved in each direction orthogonal to the imaginary straight line, there is a region in which the imaginary straight line intersects both of the two members.

In the present embodiment, a coil 4 is wound around the stator core 3 by lap winding. Hence, as shown in FIG. 10, it is configured such that when a single first segment conductor 4C and a single second segment conductor 4D are pulled out, the joint part 43 of the first held-in-slot part 401 of the first segment conductor 4C and the joint part 43 of the second held-in-slot part 402 of the second segment conductor 4D are joined together. The second held-in-slot part 402 of the first segment conductor 4C and the first held-in-slot part 401 of the second segment conductor 4D are disposed so as to be aligned in the circumferential direction Z, and are disposed at different locations in the radial direction Y. In addition, it is configured such that the joint part 43 of the second held-in-slot part 402 of the first segment conductor 4C is joined to a joint part 43 of a first held-in-slot part 401 of another second segment conductor 4D which is not shown. Likewise, it is configured such that the joint part 43 of the first held-in-slot part 401 of the second segment conductor 4D is joined to a joint part 43 of a second held-in-slot part 402 of another first segment conductor 4C which is not shown.

As shown in FIG. 8, the held-in-slot parts 40 are disposed in the slot 30, and the coil end parts 45 are disposed outside, in the axial direction X, the stator core 3. The joint parts 43 of the first segment conductors 4C and the joint parts 43 of the second segment conductors 4D face each other and are joined together in the slot 30.

The joint parts 43 each have a facing surface 44, and are formed such that facing surfaces 44 of a pair of joint parts 43 which are joined together face each other. The joint parts 43 and the facing surfaces 44 are formed such that in a state in which joint parts 43 are joined together with a pair of facing surfaces 44 facing each other, a pair of held-in-slot parts 40 (a first held-in-slot part 401 and a second held-in-slot part 402) having the facing surfaces 44 and the joint parts 43 formed thereon linearly extend in the axial direction X.

In the present embodiment, each facing surface 44 is a plane formed over the entire axial end surface of a tip part of a held-in-slot part 40 and extending in a direction inclined with respect to the axial direction X. In addition, in the present embodiment, the facing surface 44 is disposed parallel to the circumferential direction Z. Each facing surface 44 has a shape that matches a shape of another facing surface 44 facing the facing surface 44. In the present embodiment, facing surfaces 44 that face each other have identical shapes, and are disposed parallel to each other.

A conductive joint material 8 containing metallic particles is disposed between a pair of joint parts 43 facing each other. As shown in FIG. 8, in the present embodiment, a conductive joint material 8 is disposed between a pair of joint parts 43 facing each other in the slot 30. The conductive joint material 8 is disposed by, for example, applying the conductive joint material 8 to at least either one of facing surfaces 44 of the pair of joint parts 43 facing each other. The conductive joint material 8 is a joint material that joins objects together by heating, and has conductivity even after the joining. A joint part 43 of a segment conductor 4B is joined to a joint part 43 of another segment conductor 4B with a conductive joint material 8 that joins by heating. For the conductive joint material 8, for example, a paste-like joint material containing silver nanoparticles can be adopted. In this case, by heating the conductive joint material 8 made of silver nano-paste, solvent is vaporized and the remaining silver nanoparticles are metallically bonded together. The conductive joint material 8 is configured to join objects together with this metallic bonding.

2-2. Configuration of a Resin Foam

Next, a configuration of a resin foam 5 according to the present embodiment will be described.

In the present embodiment, as a resin foam 5, a sheet-like resin foam 50 integrally provided with a sheet member 50S along at least one surface of the sheet member 50S is used. As shown in FIG. 9, a sheet member 50S is disposed between an inner surface 30F of a slot 30 and an outer surface 40F of held-in-slot parts 40 facing the inner surface 30F of the slot 30, and a sheet-like resin foam 50 (resin foam 5) is provided along at least one surface of the sheet member 50S. In an example shown in the drawing, the sheet-like resin foam 50 is provided on each of both surfaces of the sheet member 50S. The sheet-like resin foams 50 are configured to be foamed (expand) by heating. FIGS. 8 and 9 show the sheet-like resin foams 50 being after foaming.

As shown in FIG. 9, the sheet-like resin foams 50 are provided so as to enclose the entire outer surface 40F of the held-in-slot parts 40. In this example, the sheet-like resin foams 50 have an overlapping part 50A formed by allowing both end parts of a portion of the sheet-like resin foams 50 that encloses the entire outer surface 40F of the held-in-slot part 40 to overlap each other. In the example shown in the drawing, the overlapping part 50A is disposed more on the first radial side Y1 (radial inner side) than the held-in-slot parts 40. In other words, the overlapping part 50A is disposed in a region on the first radial side Y1 of the slot 30. Note, however, that the configuration is not limited thereto, and the overlapping part 50A may be disposed on at least one of the second radial side Y2 (radial outer side), the first circumferential side Z1, and the second circumferential side Z2 of the held-in-slot parts 40. Note that in this example the overlapping part 50A is formed over the entire region in the axial direction X of the slot 30.

As shown in FIG. 9, in the present embodiment, each slot 30 is a semi-open slot. Specifically, the width in the circumferential direction Z of an opening part 38 that opens on the first radial side Y1 of the slot 30 is smaller than the width in the circumferential direction Z of a region of the slot 30 in which the held-in-slot parts 40 are disposed. In other words, the width in the circumferential direction Z of a tip part 36a (here, an end part on the first radial side Y1) of a tooth 36 is large compared to the width in the circumferential direction Z of a portion of the tooth 36 that is more on a back-yoke side (here, the second radial side Y2) than the tip part 36a. In the present embodiment, the sheet-like resin foams 50 are disposed along a pair of such teeth 36. Then, both end parts of a portion of the sheet-like resin foams 50 that encloses the held-in-slot parts 40 are bent along a plane on the first radial side Y1 of the held-in-slot parts 40, more on a held-in-slot part 40 side than the tip part 36a of the tooth 36, by which the both end parts of the sheet-like resin foams 50 overlap each other in a region on the first radial side Y1 (a region more on the first radial side Y1 than the held-in-slot parts 40) of the slot 30. By this, the overlapping part 50A of the sheet-like resin foams 50 is formed.

2-3. Method for Manufacturing a Rotating Electrical Machine Stator

Next, a method for manufacturing a rotating electrical machine stator 1 according to the present embodiment will be described.

Figure 11:
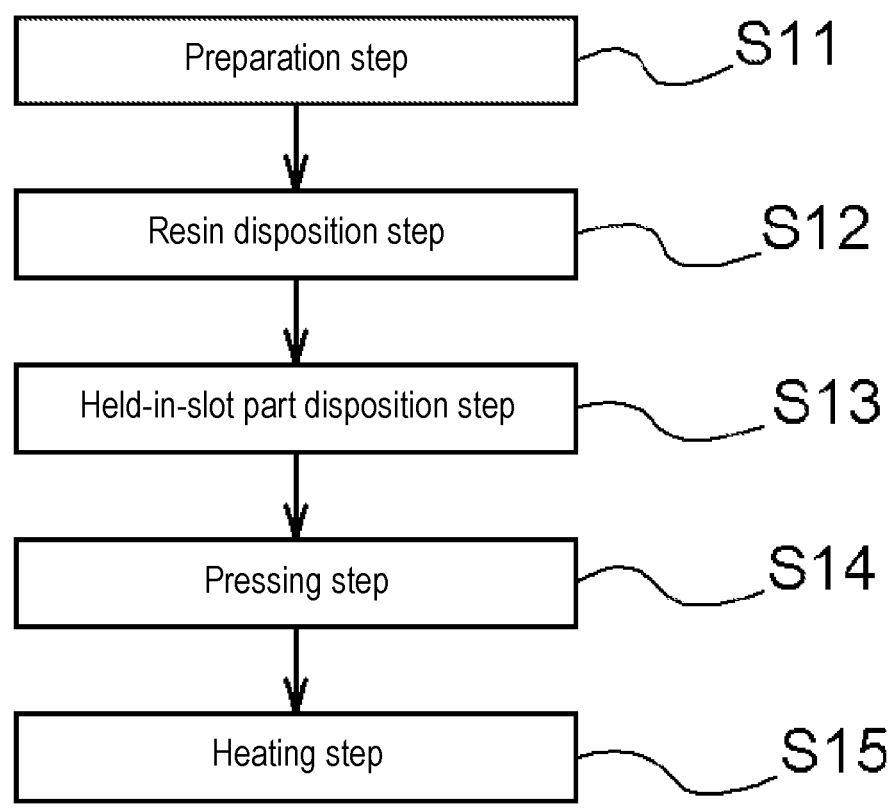
FIG. 11 is a flowchart showing manufacturing steps for the rotating electrical machine stator according to the second embodiment.

As shown in FIG. 11, in the method for manufacturing the stator 1 according to the present embodiment, a preparation step S11, a resin disposition step S12, a held-in-slot part disposition step S13, a pressing step S14, and a heating step S15 are performed in this order.

The preparation step S11 is a step of preparing a plurality of segment conductors 4B included in coils 4, and a stator core 3. In the preparation step S11, as the segment conductors 4B, a plurality of first segment conductors 4C and second segment conductors 4D whose number corresponds to that of the first segment conductors 4C are prepared.

Figure 12:
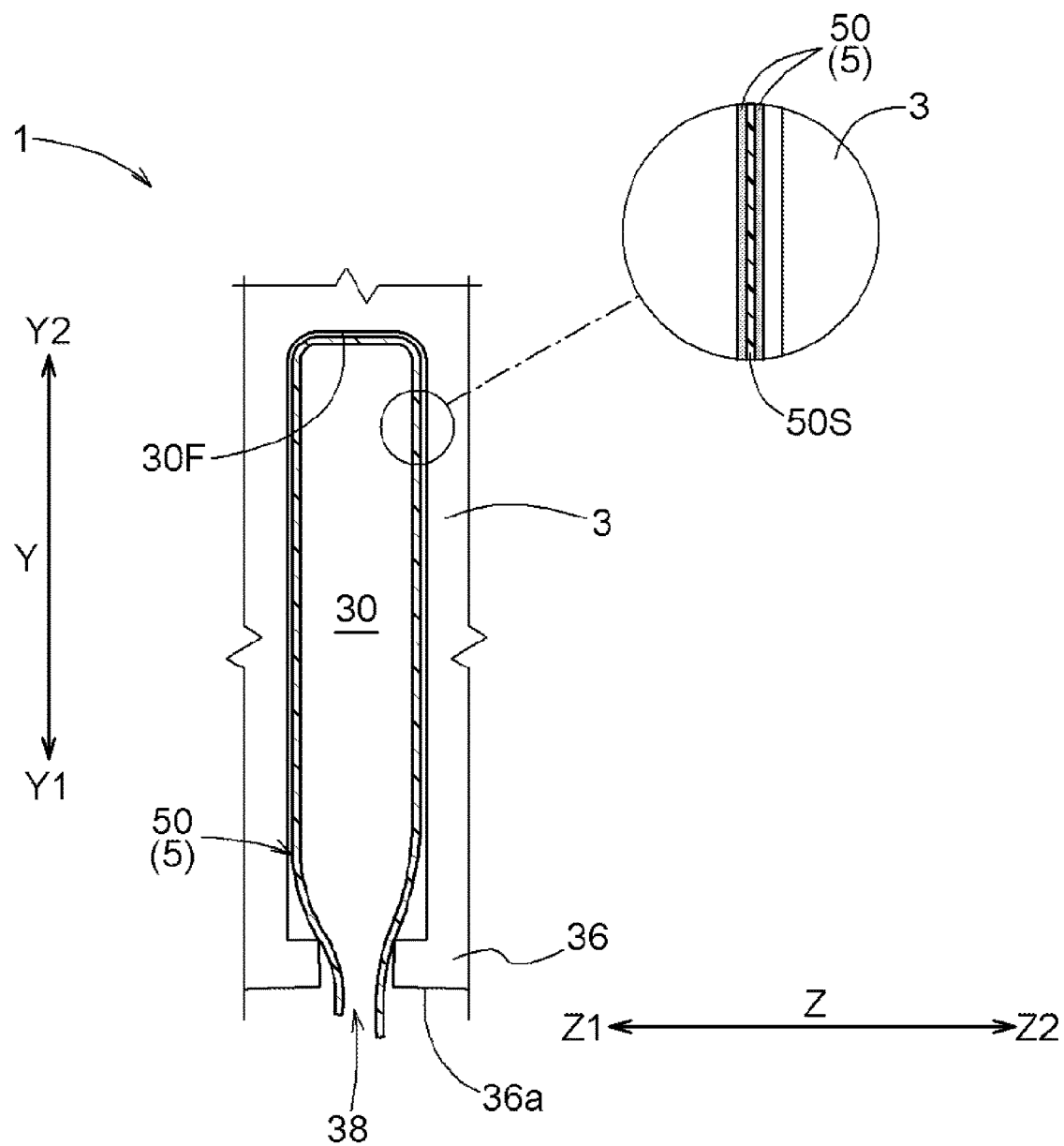
FIG. 12 is a diagram showing a resin disposition step according to the second embodiment.

FIG. 12 shows a state of the resin disposition step S12. The resin disposition step S12 is a step of disposing a resin foam 5 being before foaming on at least either one of an inner surface 30F of a slot 30 and an outer surface 40F of held-in-slot parts 40 facing the inner surface 30F of the slot 30 (see FIG. 14). In the present embodiment, as described above, as the resin foam 5 being before foaming, sheet-like resin foams 50 are used. Then, as shown in FIG. 12, in this example, the resin disposition step S12 is performed before the held-in-slot part disposition step S13 by disposing the sheet-like resin foams 50 being before foaming along the inner surface 30F of the slot 30. Note that in the present embodiment, at a stage of completion of the resin disposition step S12, both end parts of a portion of the sheet-like resin foams 50 that encloses the held-in-slot parts 40, here, both end parts on the first radial side Y1 of the sheet-like resin foams 50, are disposed extending toward an opening part 38 side (first radial side Y1) of the slot 30.

Figure 13:
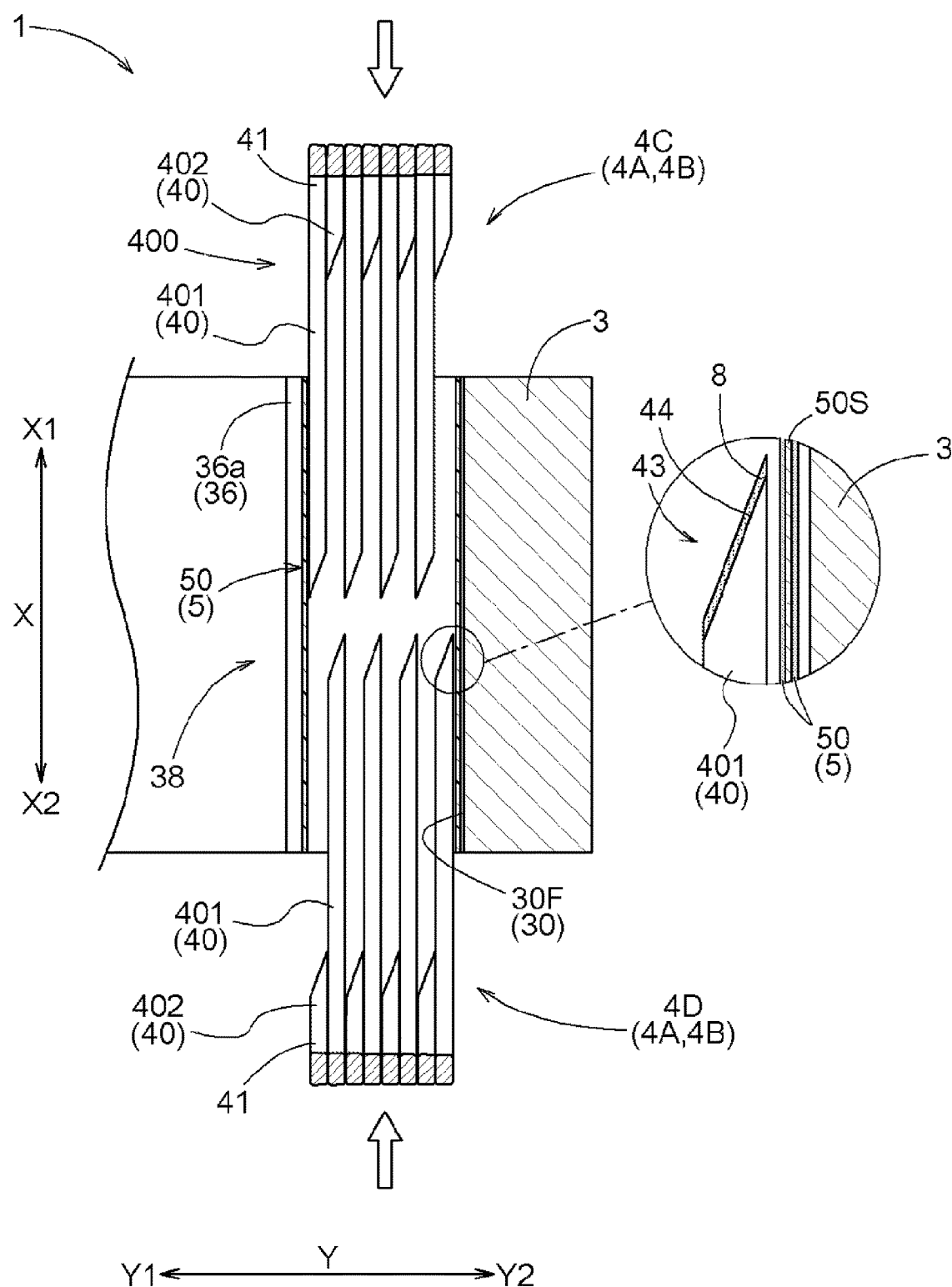
FIG. 13 is a diagram showing a held-in-slot part disposition step according to the second embodiment.
Figure 14:
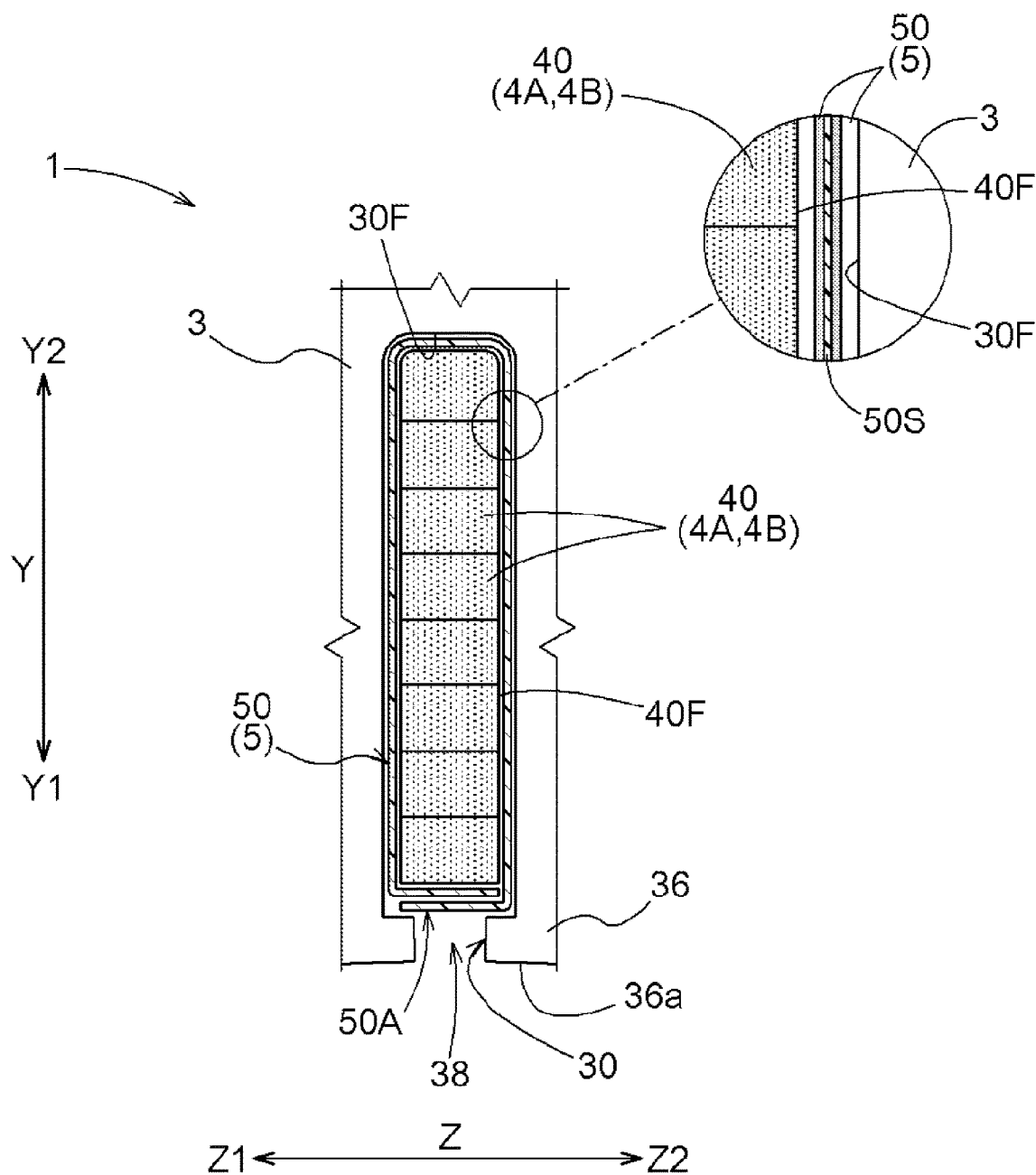
FIG. 14 is a diagram showing the held-in-slot part disposition step according to the second embodiment.

FIGS. 13 and 14 show a state of the held-in-slot part disposition step S13, and particularly, FIG. 13 shows a state of the middle of the step and FIG. 14 shows a state after completion of the step. As shown in FIG. 14, the held-in-slot part disposition step S13 is a step of disposing the held-in-slot parts 40 of the plurality of segment conductors 4B in the slot 30. In the held-in-slot part disposition step S13, the plurality of held-in-slot parts 40 are disposed in the slot 30 such that a pair of joint parts 43 which are joined together face each other and a conductive joint material 8 is disposed between the pair of joint parts 43 facing each other. In the present embodiment, as shown in FIG. 13, in the held-in-slot part disposition step S13, by inserting the plurality of segment conductors 4B into the slot 30 from both sides in the axial direction X, the held-in-slot parts 40 of the plurality of segment conductors 4B are disposed in the slot 30. More specifically, by inserting a plurality of first segment conductors 4C into the slot 30 from the first axial side X1 and inserting a plurality of second segment conductors 4D into the slot 30 from the second axial side X2, the plurality of held-in-slot parts 40 are disposed in the slot 30. In the present embodiment, in the held-in-slot part disposition step S13, the plurality of held-in-slot parts 40 are disposed such that a pair of joint parts 43 which are joined together face each other and a conductive joint material 8 is disposed between the pair of joint parts 43 facing each other. More specifically, in the held-in-slot part disposition step S13, a plurality of first segment conductors 4C and a plurality of second segment conductors 4D are disposed in a plurality of slots 30 such that in each of the slots 30, a facing surface 44 of a first held-in-slot part 401 of a first segment conductor 4C and a facing surface 44 of a second held-in-slot part 402 of a second segment conductor 4D face each other, and a facing surface 44 of a second held-in-slot part 402 of the first segment conductor 4C and a facing surface 44 of a first held-in-slot part 401 of another second segment conductor 4D face each other.

After the held-in-slot part disposition step S13, as shown in FIG. 14, both end parts of a portion of the sheet-like resin foams 50 that encloses the held-in-slot parts 40, here, both end parts on the first radial side Y1 of the sheet-like resin foams 50, are allowed to overlap each other. By this, the sheet-like resin foams 50 are formed so as to enclose the entire circumference of the outer surface 40F of the held-in-slot parts 40. Then, an overlapping part 50A is formed at a portion at which both end parts of the sheet-like resin foams 50 are allowed to overlap each other. By this, the overlapping part 50A is formed in a region on the first radial side Y1 of the slot 30. Note that though not shown, in the present embodiment, prior to the held-in-slot part disposition step S13, a step of disposing a conductive joint material 8 on at least either one of facing surfaces 44 of a pair of joint parts 43 which are joined together (joint material disposition step S131) is performed.

Figure 15:
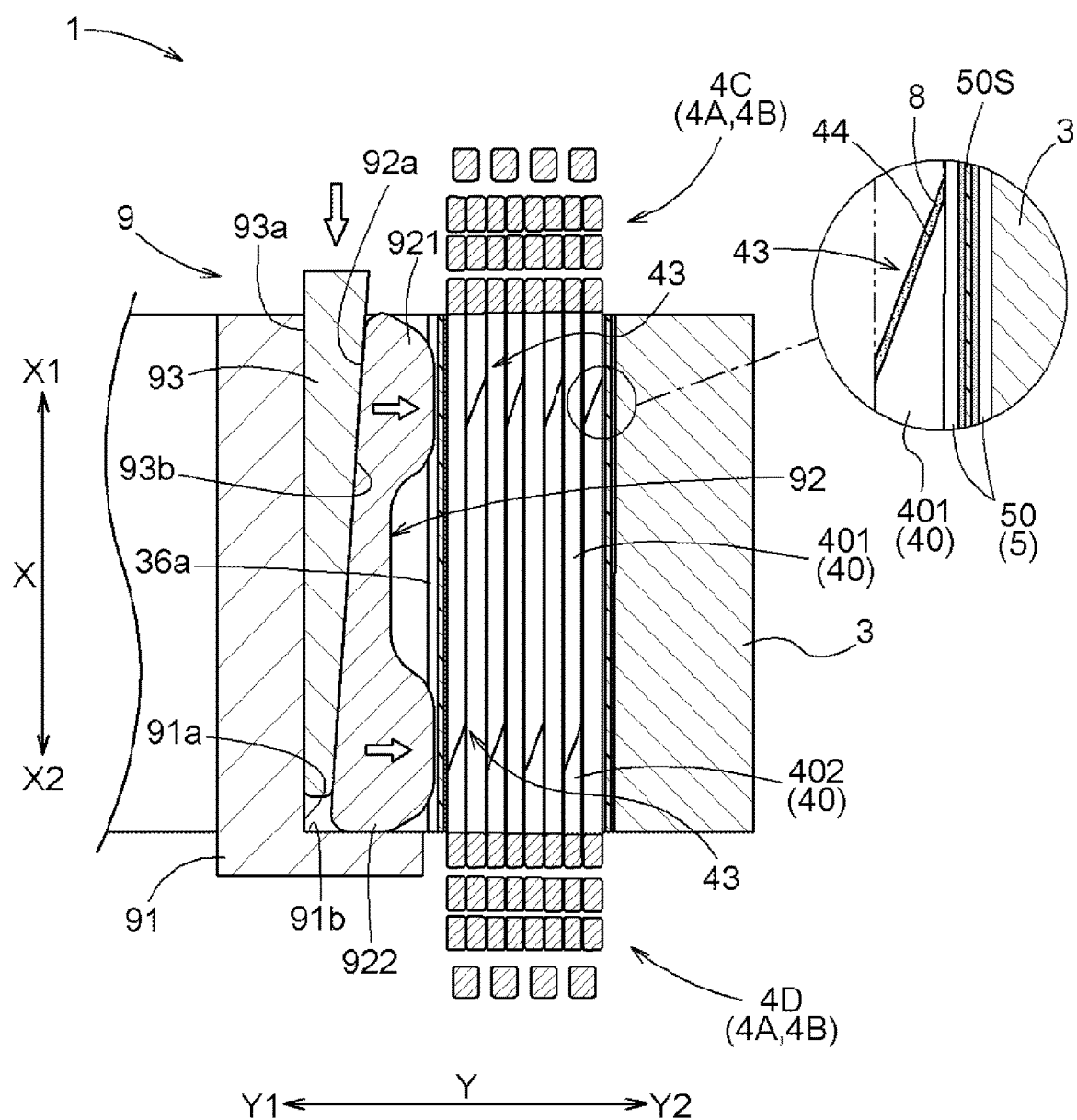
FIG. 15 is a diagram showing a pressing step according to the second embodiment.
Figure 16:
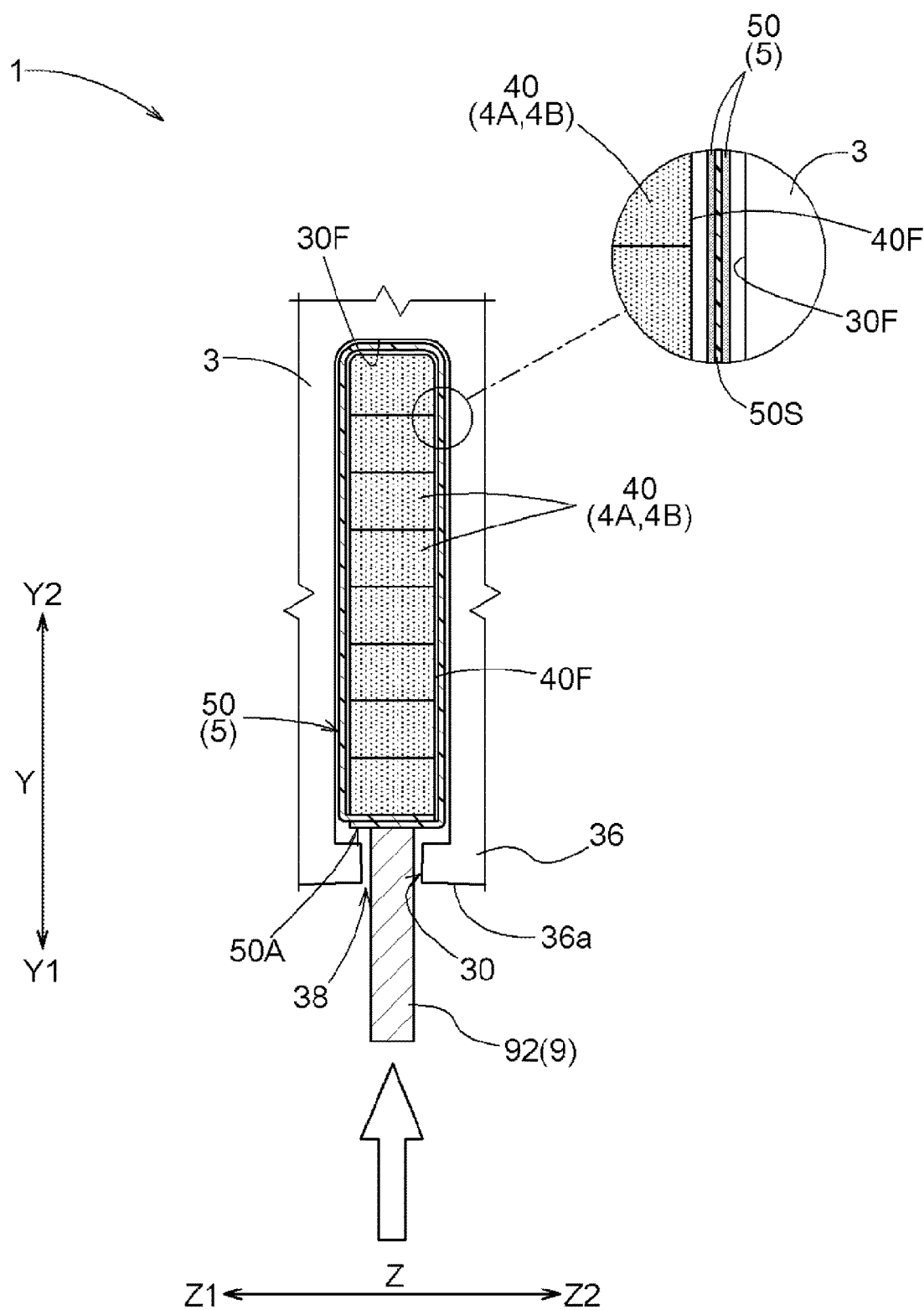
FIG. 16 is a diagram showing the pressing step according to the second embodiment.

FIGS. 15 and 16 show a state of the pressing step S14. The pressing step S14 is a step of pressing at least a part of the overlapping part 50A of the sheet-like resin foams 50. As shown in FIGS. 15 and 16, in the present embodiment, a part in the axial direction X of the overlapping part 50A formed in the axial direction X is pressed from the first radial side Y1 to the second radial side Y2. In addition, it is preferred that a portion of a plurality of segment conductors 4B that corresponds to a pair of joint parts 43 which are joined together be pressed from the opening part 38. In other words, in the pressing step S14, a region corresponding to a location at which a pair of facing surfaces 44 of a pair of joint parts 43 which are joint targets face each other is pressed from the opening part 38. Note that when, as in an example shown in the drawing, a pair of facing surfaces 44 of a pair of joint parts 43 which are joint targets is formed so as to have an overlapping portion as viewed in the radial direction Y, it is preferred that the overlapping portion as viewed in the radial direction Y be pressed in the radial direction Y in the pressing step S14. As shown in FIG. 15, in the present embodiment, the pressing step S14 is performed using a pressing device 9. The pressing device 9 includes a fixing member 91, a plurality of moving member 92, and an insertion member 93.

The fixing member 91 is formed in cylindrical shape, and has an outside diameter that allows the fixing member 91 to be disposed more on the first radial side Y1 than the plurality of segment conductors 4B disposed in the slots 30. The fixing member 91 is disposed more on the first radial side Y1 than a core inner circumferential plane (core reference plane S; see FIGS. 1 and 2) of the stator core 3 so as to be coaxial with the stator core 3, and is fixed to the stator core 3. The fixing member 91 has an outer circumferential surface 91a extending in the axial direction X over the entire region in the circumferential direction Z thereof; and a bottom surface 91b extending toward the second radial side Y2 from an end part on the second axial side X2 of the outer circumferential surface 91a. In the present embodiment, the outer circumferential surface 91a of the fixing member 91 is formed in cylindrical shape, and the bottom surface 91b is formed in disc shape.

The pressing device 9 includes the moving members 92 whose number is the same as that of the slots 30 of the stator core 3. Each moving member 92 is formed in plate shape. All moving members 92 are radially disposed with reference to the axial center of the stator core 3 so as to correspond to the slots 30 of the stator core 3. In addition, each moving member 92 is inserted into a corresponding slot 30 from the opening part 38 of the slot 30. At this time, the moving member 92 is disposed such that a part on the first radial side Y1 thereof protrudes more on the first radial side Y1 than the opening part 38 of the slot 30. In addition, each moving member 92 is placed on the bottom surface 91b of the fixing member 91. Furthermore, each moving member 92 has an inner-circumference-side inclined surface 92a. The inner-circumference-side inclined surface 92a is an inclined surface formed on a surface on the first radial side Y1 of the moving member 92 and extending more on the first radial side Y1 as it further approaches the second axial side X2 from the first axial side X1.

In addition, the moving member 92 includes a first pressing part 921 and a second pressing part 922. The first pressing part 921 and the second pressing part 922 are formed on a surface on the second radial side Y2 of the moving member 92. The first pressing part 921 is formed so as to protrude more on the second radial side Y2 than portions on both sides in the axial direction X thereof, and is disposed so as to be aligned with a location in the axial direction X of a portion at which joint parts 43 of second held-in-slot parts 402 of first segment conductors 4C and joint parts 43 of first held-in-slot parts 401 of second segment conductors 4D overlap each other as viewed in the radial direction Y. The second pressing part 922 is formed so as to protrude more on the second radial side Y2 than portions on both sides in the axial direction X thereof, and is disposed so as to be aligned with a location in the axial direction X of a portion at which joint parts 43 of first held-in-slot parts 401 of first segment conductors 4C and joint parts 43 of second held-in-slot parts 402 of second segment conductors 4D overlap each other as viewed in the radial direction Y. In the present embodiment, portions of the first pressing part 921 and the second pressing part 922 that protrude on the most second radial side Y2 both have a planar shape parallel to the axial direction X.

The insertion member 93 is formed in cylindrical shape, and is inserted between the fixing member 91 and the moving members 92 in the radial direction Y The insertion member 93 has an inner circumferential surface 93a and an outer-circumference-side inclined surface 93b.

The inner circumferential surface 93a of the insertion member 93 is formed along the outer circumferential surface 91a of the fixing member 91, and here, the inner circumferential surface 93a is a cylindrical surface having a slightly larger inside diameter than the diameter of the outer circumferential surface 91a of the fixing member 91. In addition, the outer-circumference-side inclined surface 93b of the insertion member 93 is a truncated conical surface formed such that the angle of inclination with respect to the axial direction X is the same as that of the inner-circumference-side inclined surface 92a of the moving member 92. In addition, the thickness in the radial direction Y of the insertion member 93 is set such that in a state in which each moving member 92 has moved to the most second radial side Y2 in a moving range, a lower end part of the insertion member 93 that comes into contact with the inner-circumference-side inclined surface 92a of the moving member 92 does not abut on the bottom surface 91b of the fixing member 91.

In the pressing step S14, by inserting the insertion member 93 between the fixing member 91 and the plurality of radially disposed moving members 92 in the radial direction Y from the first axial side X1, each moving member 92 is allowed to move to the second radial side Y2 along the bottom surface 91b of the fixing member 91. By this, the first pressing part 921 and the second pressing part 922 of the moving member 92 press a pair of held-in-slot parts 40 located on the most first radial side Y1 in a slot 30 from the first radial side Y1 (i.e., from the opening part 38 of the slot 30). By the moving member 92 further moving to the second radial side Y2, all of a plurality of segment conductors 4B disposed in the slot 30 are pressed between the moving member 92 and an inner surface 30F on the second radial side Y2 of the slot 30. In this manner, in the pressing step S14 of the present embodiment, the joint parts 43 of all segment conductors 4B in all slots 30 can be pressed using the pressing device 9. At this time, since a pair of held-in-slot parts 40 which are joined together are linearly disposed in the axial direction X, a pressing force exerted by the first pressing part 921 and a pressing force exerted by the second pressing part 922 are less likely to become non-uniform.

Figure 17:
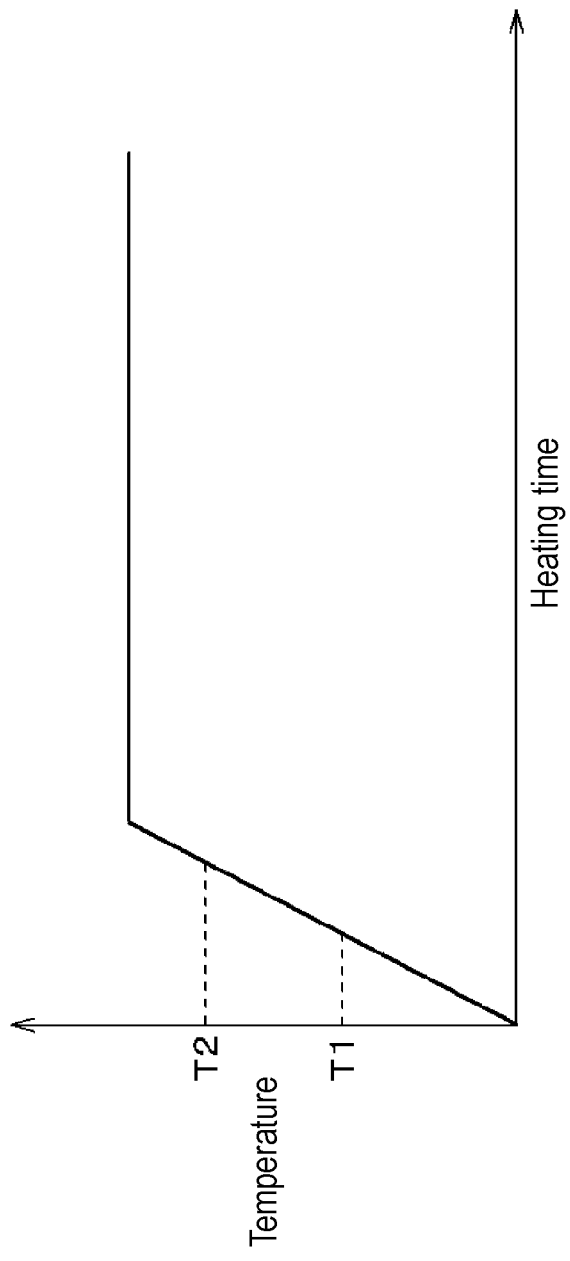
FIG. 17 is a diagram showing a relationship between heating time and temperature in a heating step according to the second embodiment.

The heating step S15 is a step of heating and foaming the sheet-like resin foams 50 after the held-in-slot part disposition step S13. In the heating step S15, the resin foams 5 (here, the sheet-like resin foams 50) and the conductive joint materials 8 are heated, by which the resin foams 5 are foamed and each pair of joint parts 43 are joined together with the conductive joint materials 8. In other words, by the heating step S15, a resin foaming step S151 in which the sheet-like resin foams 50 are foamed and a joining step S152 in which a pair of joint parts 43 facing each other, here, a pair of joint parts 43 facing each other in a slot 30, are joined together are performed. In the heating step S15, heating is performed at a temperature in a temperature range in which both of a foaming temperature range which is a temperature range suitable for the sheet-like resin foams 50 and a joint temperature range which is a temperature range suitable for joining with the conductive joint materials 8 overlap each other. Such a temperature range is, for example, 100° C. to 400° C., and more preferably, 200° C. to 300° C. In the present embodiment, the conductive joint materials 8 are configured to join a pair of joint parts 43 together at a joint temperature T2 higher than a foaming temperature T1 at which the resin foams 5 are foamed (see FIG. 17). As shown in FIG. 17, in the heating step S15, by increasing the temperature to the joint temperature T2 using a single heating device (not shown), the resin foams 5 and the conductive joint materials 8 are heated. In this example, the temperature is continuously increased by the heating device until the temperature reaches the joint temperature T2. At this time, before the temperature reaches the joint temperature T2, the temperature reaches the foaming temperature T1 lower than the joint temperature T2. Hence, by continuously increasing the temperature until reaching the joint temperature T2, each pair of joint parts 43 can be joined together with the conductive joint materials 8 and the resin foams 5 can be foamed. In an example shown in the drawing, in the heating step S15, after reaching the joint temperature T2, while a set temperature higher than the joint temperature T2 is maintained, the resin foams 5 and the conductive joint materials 8 are heated. By this, the temperature can be highly reliably increased to the joint temperature T2, enabling to appropriately join each pair of joint parts 43 together with the conductive joint materials 8. Note that in the present embodiment, the foaming temperature T1 is a temperature at which the resin foams 5 start to be foamed, and the joint temperature T2 is a temperature at which the conductive joint materials 8 start to join. In addition, for the heating device used in the heating step S15, for example, a furnace that can heat the entire stator 1, etc., can be used.

In addition, the heating step S15 is performed with movement of a pair of joint parts 43 in a direction in which the pair of joint parts 43 face each other (in this example, the radial direction Y) restricted. In the present embodiment, the heating step S15 is performed with a pressed state brought about in the pressing step S14 maintained. By this, a pair of joint parts 43 are joined together in an appropriate positional relationship, with movement of the pair of joint parts 43 restricted. In addition, by thus performing the heating step S15 with the pressed state maintained, the sheet-like resin foams 50 are foamed with the overlapping part 50A of the sheet-like resin foams 50 pressed, enabling to join the overlapping part 50A by the sheet-like resin foams 50 themselves. Therefore, there is no need to separately provide a step of joining the overlapping part 50A.

3. Third Embodiment

Next, a third embodiment of a rotating electrical machine stator 1 and a method for manufacturing the rotating electrical machine stator 1 will be described. In the following, the third embodiment will be described mainly about differences from the first and second embodiments. Points that are not particularly described are the same as those of the first or second embodiment.

Figure 18:
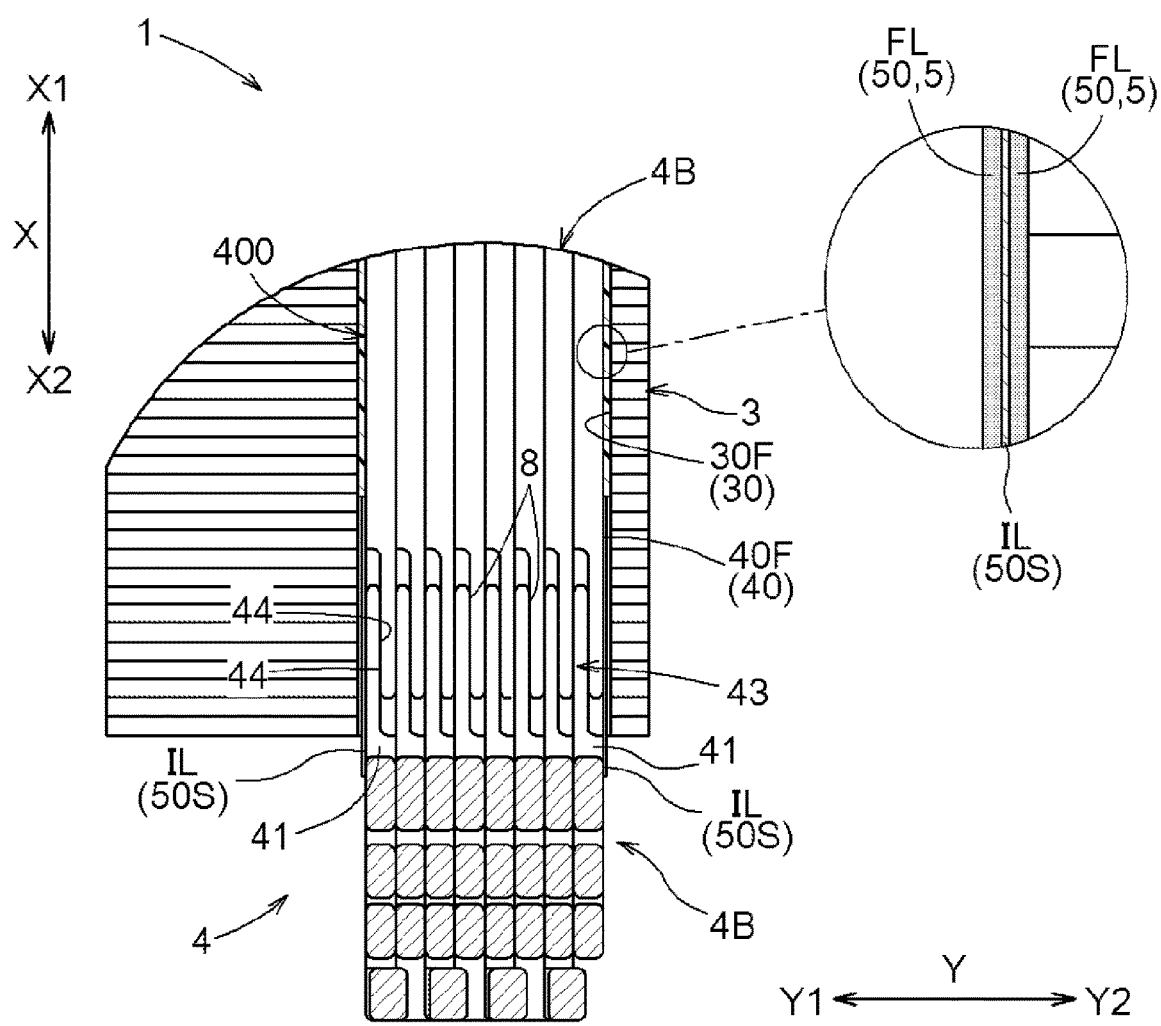
FIG. 18 is an axial cross-sectional view of a part of a rotating electrical machine stator according to a third embodiment.

As shown in FIG. 18, fixing layers FL that fix a coil 4 to a stator core 3 and an insulating layer IL that electrically isolates the stator core 3 from the coil 4 are provided between an inner surface 30F of a slot 30 and an outer surface 40F of held-in-slot parts 40. In this example, a pair of fixing layers FL and an insulating layer IL disposed between the pair of fixing layers FL form a three-layer structure.

In the present embodiment, sheet-like resin foams 50 form the fixing layers FL. The fixing layers FL are configured to bond and fix together the stator core 3 and the coil 4 by the sheet-like resin foams 50 cured when heated. The fixing layers FL are also preferably formed as bonding layers including an adhesive.

As shown in FIG. 18, in the slot 30 there are disposed joint parts 43 that join a plurality of segment conductors 4B together. In an example shown in the drawing, a facing surface 44 of each of the plurality of joint parts 43 faces in the radial direction Y. One of facing surfaces 44 of a pair of joint parts 43 which are joint targets faces on the first radial side Y1, and the other faces the second radial side Y2.

In the present embodiment, a sheet member 50S forms the insulating layer IL. The insulating layer IL is made of, for example, Poly Phenylene Sulfide (PPS) resin. In addition, the insulating layer IL may be formed in the form of nonwoven fabrics such as aramid paper.

Here, the fixing layers FL are configured to cover held-in-slot parts 40 (more specifically, an outer surface 40F of the held-in-slot parts 40). In this example, the fixing layers FL are configured to partially cover the held-in-slot parts 40, excluding the joint parts 43. In other words, the fixing layers FL are disposed more on a central side in the axial direction X of the held-in-slot parts 40 than a location in the axial direction X where the joint parts 43 are disposed. The fixing layers FL are disposed so as not to overlap the joint parts 43 as viewed in the radial direction Y and the circumferential direction Z (see FIG. 1, etc.).

In addition, in the present embodiment, the insulating layer IL is configured to cover the entire held-in-slot parts 40 and a part of extending parts 41 that continue with the held-in-slot parts 40 and protrude outward in the axial direction X from the slot 30. In this example, the insulating layer IL is configured to cover the joint parts 43. In other words, an end part in the axial direction X of the insulating layer IL is disposed more outward in the axial direction X than the joint parts 43 disposed in the slot 30. The insulating layer IL is disposed so as to overlap the joint parts 43 as viewed in the radial direction Y and the circumferential direction Z (see FIG. 1, etc.).

Although the third embodiment is described above, the joint parts 43 are not limited to being disposed in the slot 30, and may be disposed outside the slot 30. Namely, in this case, the joint parts 43 are formed at the extending parts 41 that protrude outward in the axial direction X from the slot 30, instead of being formed at the held-in-slot parts 40. In this case, the fixing layers FL may be configured to cover the entire held-in-slot parts 40. In this case, too, the fixing layers FL do not cover the joint parts 43.

4. Other Embodiments

Next, other embodiments of a rotating electrical machine stator 1 and a method for manufacturing the rotating electrical machine stator 1 will be described.

Figure 19:
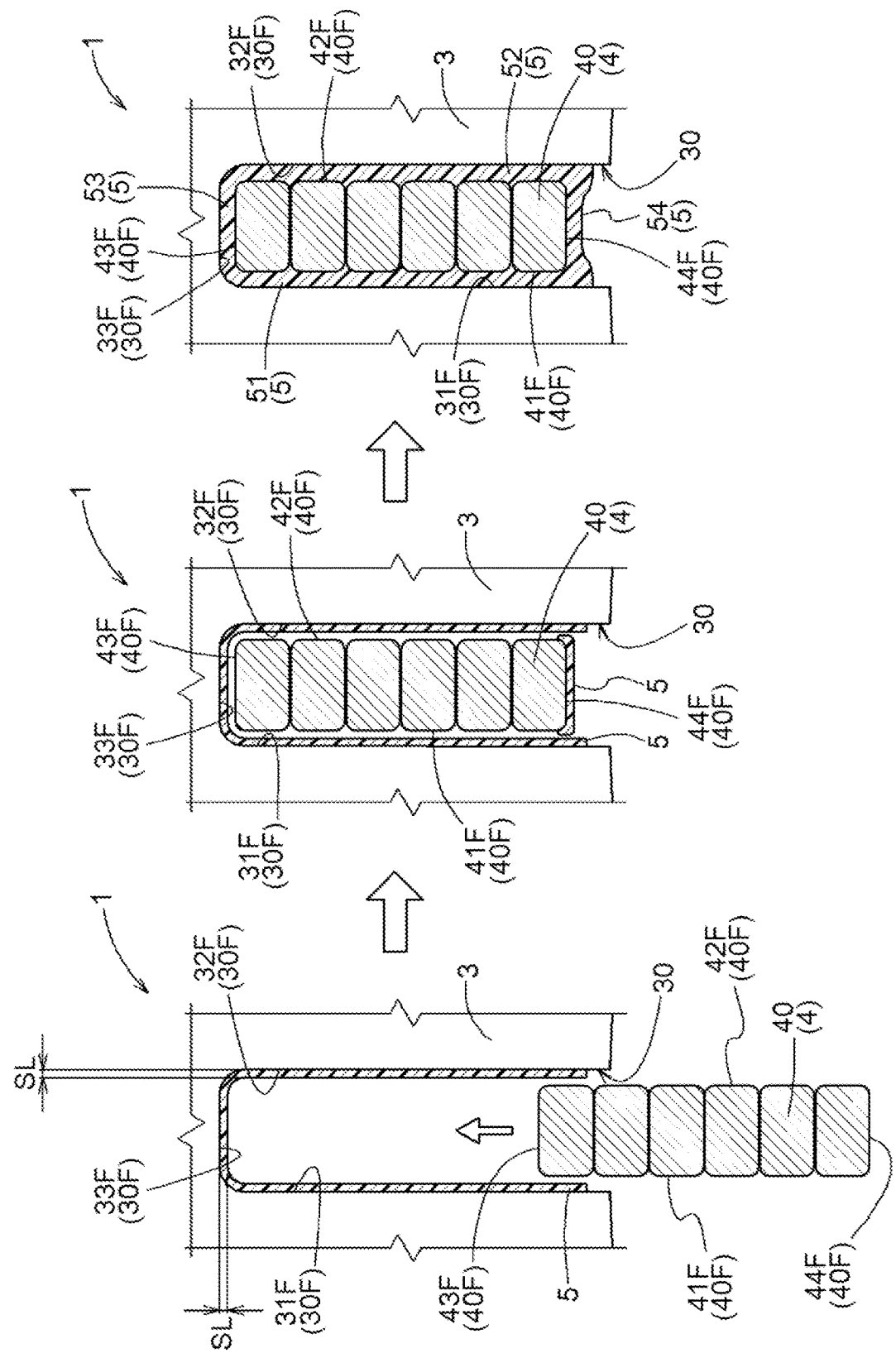
FIG. 19 is a diagram showing a resin disposition step and a resin foaming step in another embodiment.

(1) The above-described first embodiment describes, as an example, a configuration in which a resin foam 5 is provided on an outer surface 40F of a held-in-slot part 40 other than a rotor-side outer surface part 44F. However, the configuration is not limited thereto, and for example, a configuration may be adopted in which a portion of the outer surface 40F of the held-in-slot part 40 facing an opening part 38 (the rotor-side outer surface part 44F) is covered by a resin foam 5. By such a configuration, the entry of foreign matter into a slot 30 from the opening part 38 of the slot 30 can be restricted. Therefore, a reduction in electrical insulation properties between the stator core 3 and a coil 4 caused by such foreign matter can be suppressed. In this case, the resin application step S1 further includes a step of applying a resin foam 5 being before foaming to the rotor-side outer surface part 44F of the held-in-slot part 40. For example, first, as shown in a diagram on the left in FIG. 19, a resin foam 5 being before foaming is applied to an inner surface 30F of a slot 30, and thereafter, a held-in-slot part 40 is disposed in the slot 30. Then, as shown in a diagram in the center of FIG. 19, a resin foam 5 being before foaming is also applied to a rotor-side outer surface part 44F of the held-in-slot part 40. Note that although in an example shown in the drawing, the application of a resin foam 5 to the rotor-side outer surface part 44F is performed after a held-in-slot part disposition step S4, the application of a resin foam 5 to the rotor-side outer surface part 44F may be performed before the held-in-slot part disposition step S4. Thereafter, as shown in a diagram on the right in FIG. 19, the resin foam 5 being before foaming is foamed in a resin foaming step S5. Note that a thickness adjustment step S2 and a resin drying step S3 are performed at appropriate timing before the resin foaming step S5.

Figure 20:
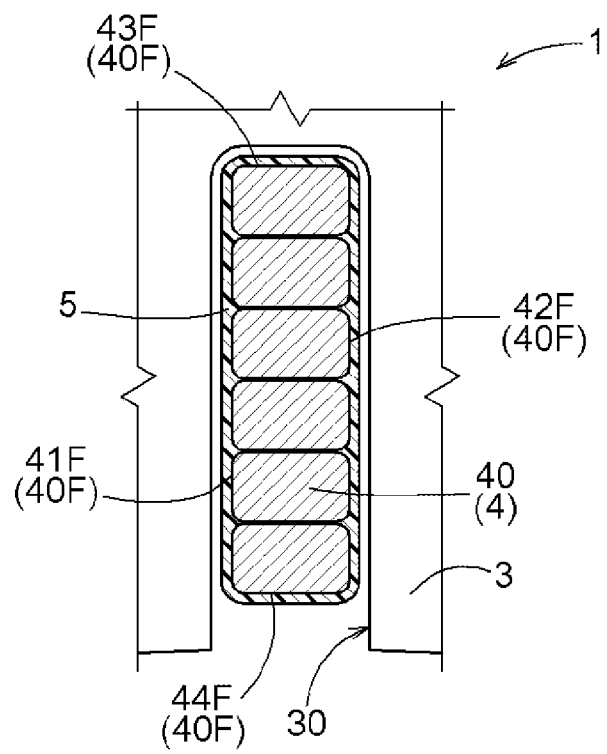
FIG. 20 is a diagram showing before a resin foam is foamed in another embodiment.

(2) The above-described first embodiment describes an example in which a resin foam 5 being before foaming is applied to an inner surface 30F of a slot 30 in a resin application step S1. However, the configuration is not limited thereto, and in the resin application step S1, as shown in FIG. 20, a resin foam 5 being before foaming may be applied to an outer surface 40F of a held-in-slot part 40. Furthermore, at this time, it is preferred that a resin foam 5 be also applied to a rotor-side outer surface part 44F. By this, the resin foam 5 can be provided to the entire outer surface 40F of the held-in-slot part 40 including the rotor-side outer surface part 44F. In other words, a first resin part 51, a second resin part 52, a connecting resin part 53, and a rotor-side resin part 54 can be formed between the inner surface 30F of the slot 30 and the outer surface 40F of the held-in-slot part 40 (see also a diagram on the right in FIG. 19).

Figure 21:
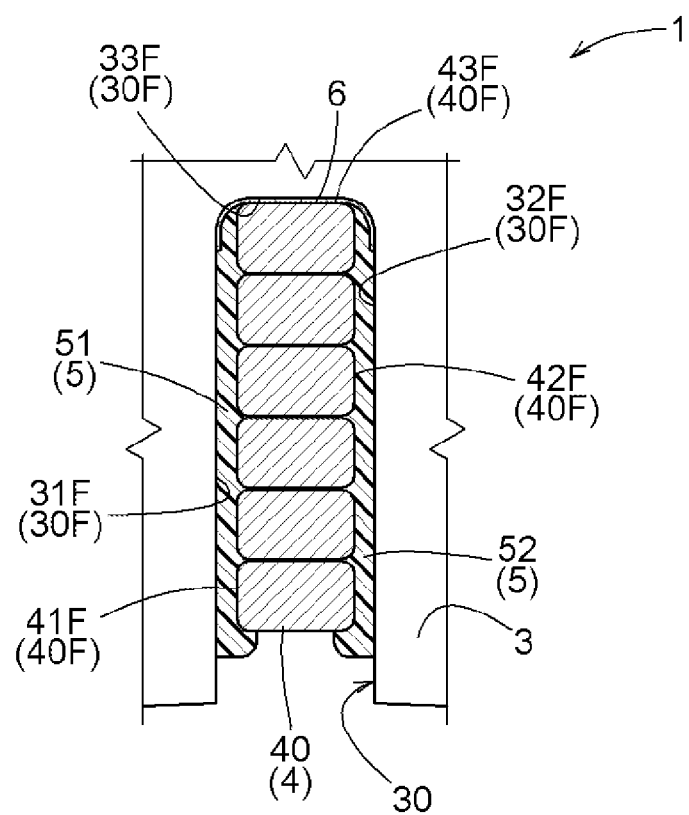
FIG. 21 is a diagram showing after the resin foam is foamed in another embodiment.

(3) The above-described first embodiment describes, as an example, a configuration in which the entire region of an outer surface 40F of a held-in-slot part 40 that faces an inner surface 30F of a slot 30 is covered by a resin foam 5. However, the configuration is not limited thereto, and a configuration may be adopted in which a part of the facing region is covered by a resin foam 5. For example, as shown in FIG. 21, an insulating sheet material 6 may be disposed between a connecting inner surface part 33F and a connecting outer surface part 43F to electrically isolate them from each other, and a resin foam 5 may be provided so as to cover a first outer surface part 41F and a second outer surface part 42F of a held-in-slot part 40, with both end parts in the circumferential direction Z of the insulating sheet material 6 wrapped in the resin foam 5.

(4) The above-described first embodiment describes, as an example, a configuration in which an outer resin part 55 of a resin foam 5 is provided on an axial end surface 34F of the stator core 3. However, the configuration is not limited thereto, and the outer resin part 55 may be provided in any manner as long as the outer resin part 55 is provided between the axial end surface 34F of the stator core 3 and a coil end part 45 and outside the stator core 3. For example, the outer resin part 55 may be provided on an outer surface 45AF of a protruding portion 45A of the coil end part 45. In addition, a first resin part 51, a second resin part 52, and a connecting resin part 53 may be formed so as to extend out of a slot 30 in the axial direction X, and the extending portions of the resin parts 51 to 53 may serve as an outer resin part 55.

(5) The above-described first embodiment describes an example in which a rotating electrical machine stator 1 is manufactured by performing a resin application step S1 serving as a resin disposition step, a thickness adjustment step S2, a resin drying step S3, a held-in-slot part disposition step S4, and a resin foaming step S5 by a heating step in this order. However, a method for manufacturing the rotating electrical machine stator 1 includes at least the resin application step S1, the held-in-slot part disposition step S4, and the resin foaming step S5. It is preferred that, for example, the method for manufacturing the rotating electrical machine stator 1 include those three steps (S1, S4, and S5) and combine the above-described thickness adjustment step S2 and resin drying step S3 with the three steps. Specifically, the resin application step S1, the thickness adjustment step S2, the held-in-slot part disposition step S4, and the resin foaming step S5 may be performed in this order. Alternatively, the resin application step S1, the resin drying step S3, the held-in-slot part disposition step S4, and the resin foaming step S5 may be performed in this order.

Figure 22:
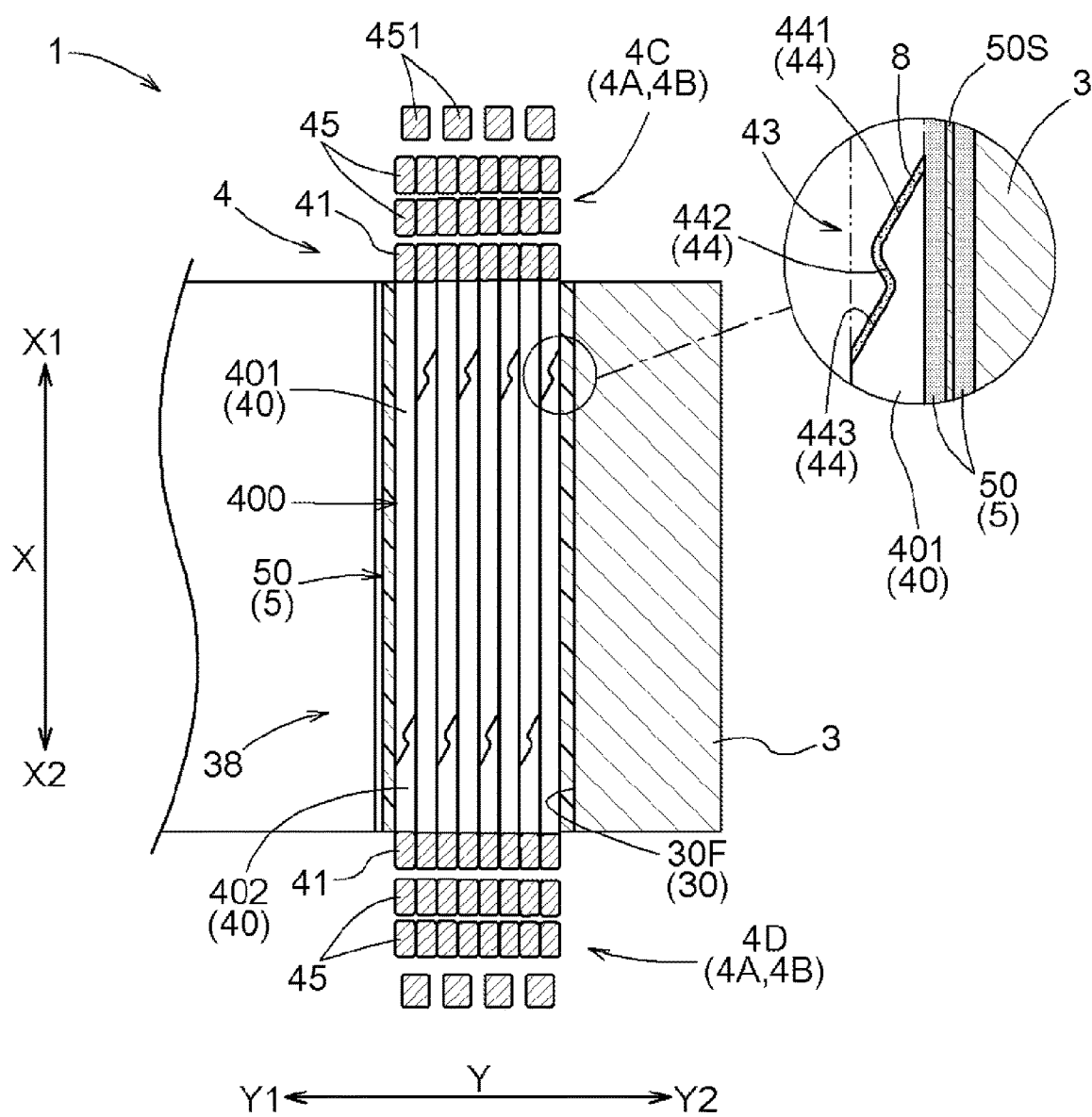
FIG. 22 is a diagram showing a configuration of a facing surface according to another embodiment.

(6) The above-described second embodiment describes, as an example, a configuration in which a facing surface 44 of a joint part 43 is a single plane extending in a direction inclined with respect to the axial direction X. However, the configuration is not limited thereto, and the facing surface 44 may include a combination of a plurality of surfaces (planes or curved planes), and for example, as shown in FIG. 22, the facing surface 44 may include a plurality of surfaces with different inclined directions with respect to the axial direction X. In an example shown in FIG. 22, the facing surface 44 is configured to include a first inclined surface 441, a second inclined surface 442 extending in a direction crossing the first inclined surface 441, and a third inclined surface 443 extending in a direction crossing the second inclined surface 442 and parallel to the first inclined surface 441.

(7) The above-described second embodiment describes, as an example, a configuration in which in a pressing step S14, joint parts 43 of all segment conductors 4B in all slots 30 are pressed using the pressing device 9 and joined together. However, the configuration is not limited thereto, and for example, a configuration may be adopted in which the pressing step S14 for the segment conductors 4B is performed on a per slot 30 basis, and a joining step S152 is performed on a per slot 30 basis. In this case, the joining step S152 may be performed independently of a heating step S15 (resin foaming step).

(8) The above-described second embodiment describes, as an example, a configuration in which a coil 4 includes a plurality of segment conductors 4B configured to be wound around the stator core 3 by lap winding. However, the configuration is not limited thereto, and for example, a configuration may be adopted in which a coil 4 includes a plurality of segment conductors 4B configured to be wound around the stator core 3 by wave winding.

(9) The above-described second embodiment describes, as an example, a configuration in which the cross-sectional shape of a surface of a segment conductor 4B orthogonal to an extending direction is rectangular. However, the configuration is not limited thereto, and the cross-sectional shape of a linear conductor may be a shape other than a rectangular shape, and may be, for example, a circular shape or an elliptical shape or may be a polygonal shape such as a triangular shape or a pentagonal or higher polygonal shape.

(10) The above-described second embodiment describes, as an example, a configuration in which a slot 30 extends in parallel to the axial direction X. However, the configuration is not limited thereto, and it is also preferred to adopt a configuration in which all or part of the slot 30 extends inclined with respect to the axial direction X. In this case, too, the slot 30 extends in the axial direction X.

(11) The above-described second embodiment describes, as an example, a configuration in which a conductive joint material 8 is disposed on at least either one of facing surfaces 44, which face each other, of a pair of segment conductors 4B, and a pair of joint parts 43 (facing surfaces 44) are joined together using the conductive joint material 8. However, the configuration is not limited thereto, and for example, a configuration may be adopted in which a pair of joint parts 43 (facing surfaces 44) are joined together by welding, etc., without using a joint material. In this case, a joining step S152 is performed independently of a heating step S15 (resin foaming step).

(12) The above-described second embodiment describes, as an example, a case in which a segment conductor 4B is configured to be formed in U-shape as viewed in the radial direction Y and to have a pair of held-in-slot parts 40 and a coil end part 45 that connects the pair of held-in-slot parts 40. However, the shape of the segment conductor 4B is not limited thereto, and for example, the segment conductor 4B may be configured to be formed in J-shape and to have a single held-in-slot part 40 and a coil end part 45 connected to the held-in-slot part 40.

Figure 23:
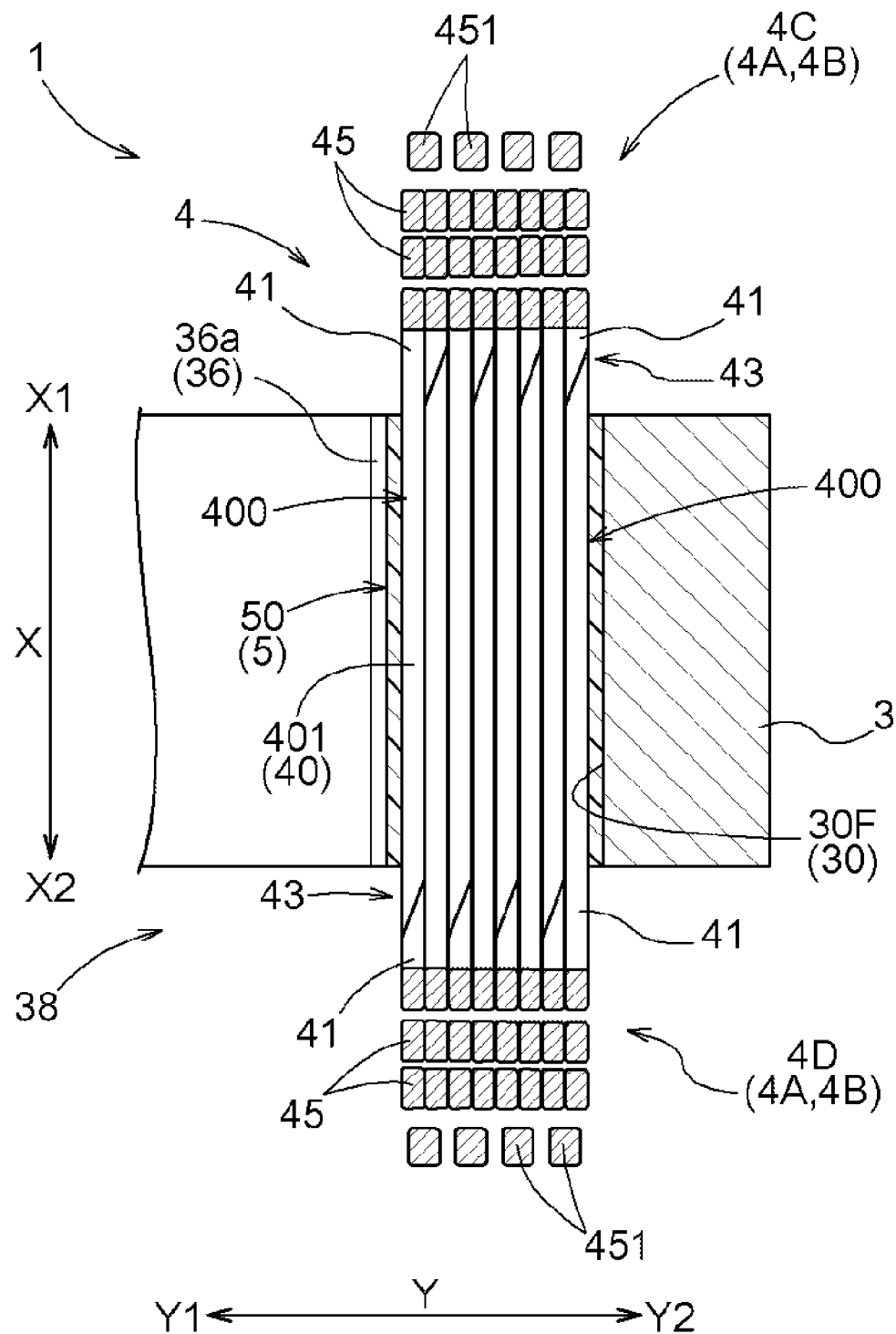
FIG. 23 is an axial cross-sectional view of a part of a rotating electrical machine stator according to another embodiment.

(13) The above-described second embodiment describes an example in which a held-in-slot part 40 of a leg part 400 of each of a plurality of segment conductors 4B is provided with a joint part 43 that is joined to another segment conductor 4B. However, the example is not limited thereto. For example, as shown in FIG. 23, a joint part 43 may be provided at an extending part 41 of a leg part 400. Namely, the joint part 43 may be disposed outside a slot 30.

(14) Each of the above-described embodiments describes an example in which the rotating electrical machine 100 to which the rotating electrical machine stator 1 is applied is configured as a radial-gap inner rotor type. However, the configuration is not limited thereto, and for example, the rotating electrical machine 100 may be of an outer rotor type, and furthermore, the rotating electrical machine 100 is not limited to the radial-gap type and may be of an axial-gap type. Note that in the case of the radial-gap type, the above-described end surface 34F of the stator core 3 is an end surface in the axial direction X of the stator core 3, but in the case of the axial-gap type, the end surface 34F of the stator core 3 is an end surface in the radial direction Y of the stator core 3.

(15) Each of the above-described embodiments describes, as an example, a case in which the stator 1 is applied to the rotating electrical machine 100 driven by three-phase alternating current. Such a rotating electrical machine 100 may be, for example, a synchronous motor (generator) with an embedded magnet structure or may be a synchronous motor (generator) with a surface magnet structure. Alternatively, in addition to the synchronous motor (generator), an induction motor (generator), etc., may be used. In addition, as power supplied to such a rotating electrical machine 100, alternating current other than three-phase alternating current such as single-phase alternating current or multiphase alternating current such as two-phase alternating current or four or more phase alternating current can also be used.

(16) Note that a configuration disclosed in each of the above-described embodiments can also be applied in combination with a configuration disclosed in another embodiment as long as contradiction does not arise. For other configurations, too, the embodiments disclosed in this specification are in all respects merely illustrative. Therefore, it is possible to make various modifications as appropriate without departing from the spirit and scope of the present disclosure.

5. Summary of the Above-Described Embodiments

A summary of the above-described embodiments will be described below.

In a method for manufacturing a rotating electrical machine stator (1) including a stator core (3) having a slot (30); and a coil (4) having a leg part (400) including a held-in-slot part (40) held in the slot (30) and a portion (41) extending from the held-in-slot part (40), the coil (4) is formed by joining a plurality of segment conductors (4B) together, the leg parts (400) of the plurality of segment conductors (4B) each are provided with a joint part (43) that is joined to another one of the segment conductors (4B) with a conductive joint material (8) that joins by heating, and the method includes:

a resin disposition step (S12) of disposing a resin foam (5) being before foaming on at least either one of an inner surface (30F) of the slot (30) and an outer surface (40F) of the held-in-slot part (40) facing the inner surface (30F) of the slot (30);

a held-in-slot part disposition step (S4, S13) of disposing a plurality of the held-in-slot parts (40) in the slot (30) such that a pair of the joint parts (43) to be joined together face each other and the conductive joint material (8) is disposed between the pair of the joint parts (43) facing each other; and a heating step (S15) of heating the resin foam (5) and the conductive joint material (8) after the held-in-slot part disposition step (S4, S13), to foam the resin foam (5) and join the pair of the joint parts (43) together with the conductive joint material (8).

According to this method, joining together of a pair of joint parts (43) for joining a plurality of segment conductors (4B) together with a conductive joint material (8) can be performed in a heating step (S15) for heating and foaming a resin foam (5). Therefore, an increase in the number of manufacturing steps for a rotating electrical machine stator (1) can be suppressed to a low level, enabling to implement the rotating electrical machine stator (1) with high productivity.

In addition, it is preferred that the conductive joint material (8) be configured to join the pair of the joint parts (43) together at a joint temperature (T2) higher than a foaming temperature (T1) at which the resin foam (5) is foamed, and in the heating step (S15) the resin foam (5) and the conductive joint material (8) be heated by increasing a temperature to the joint temperature (T2) using a single heating device.

According to this method, by increasing a temperature to the joint temperature (T2) using a single heating device, the temperature reaches the foaming temperature (T1) lower than the joint temperature (T2) before reaching the joint temperature (T2). Hence, the resin foam (5) and the conductive joint material (8) which are different materials do not need to be heated using different heating devices, and foaming of the resin foam (5) and joining together of the pair of joint parts (43) with the conductive joint material (8) can be performed by heating using a single heating device.

In addition, it is preferred that the coil (4) have a coil end part (45) disposed outside the slot (30), and the resin disposition step (S1, S12) include a step of disposing the resin foam (5) being before foaming on at least either one of an outer surface (45AF) of a protruding portion (45A) of the coil end part (45) and an end surface (34F) of the stator core (3) facing the protruding portion (45A), the protruding portion (45A) protruding from the slot (30).

According to this method, securing of electrical insulation properties in a region outside the slot (30) in which a protruding portion (45A) of a coil end part (45) and an end surface (34F) of the stator core (3) facing the protruding portion (45A) are disposed close to each other can be appropriately performed.

In addition, it is preferred that the heating step (S15) be performed with movement of the pair of the joint parts (43) in a direction in which the pair of the joint parts (43) face each other restricted.

According to this method, the pair of joint parts (43) can be appropriately joined together so as not to be displaced from each other.

In addition, it is preferred that as the resin foam (5) being before foaming, a sheet-like resin foam (50) integrally provided with a sheet member (50S) along at least one surface of the sheet member (50S) be used, and the resin disposition step (S12) be performed before the held-in-slot part disposition step (S13) by disposing the sheet-like resin foam (50) being before foaming along the inner surface (30F) of the slot (30).

According to this method, a resin foam (5, 50) can be easily disposed along the inner surface (30F) of the slot (30). Hence, it is easy to achieve a reduction in the number of steps of the resin disposition step (S12).

In addition, it is preferred that after the held-in-slot part disposition step (S13), the sheet-like resin foam (50) be formed so as to enclose an entire circumference of the outer surface (40F) of the held-in-slot part (40), both end parts of a portion of the sheet-like resin foam (50) that encloses the entire circumference of the outer surface (40F) be allowed to overlap each other, and a pressing step (S14) of pressing at least a part of the overlapping portion (50A) be performed, and the heating step (S15) be performed while a pressed state brought about in the pressing step (S14) is maintained.

According to this method, the overlapping portion (50A) of the sheet-like resin foam (50) can be joined with the resin foam (5, 50) that is foamed in a pressed state. Therefore, according to this method, there is no need to separately provide a step of joining the overlapping portion (50A). Then, a state in which the entire circumference of the outer surface (40F) of the held-in-slot part (40) is enclosed by the sheet-like resin foam (50) being after foaming can be brought about, enabling to implement a configuration that facilitates appropriate securing of electrical insulation properties between the inner surface (30F) of the slot (30) and the outer surface (40F) of the held-in-slot part (40).

In addition, it is preferred that the resin disposition step (S1) be performed by applying the resin foam (5) being before foaming to at least either one of the inner surface (30F) of the slot (30) and the outer surface (40F) of the held-in-slot part 40 facing the inner surface (30F) of the slot (30).

According to this method, it is easy to dispose a resin foam (5) at necessary locations and at necessary thickness. Therefore, it is easy to appropriately fix the coil (4) to the stator core (3).

In addition, it is preferred that the method further include, before the held-in-slot part disposition step (S4), a thickness adjustment step (S2) of adjusting the thickness of the resin foam (5) being before foaming applied in the resin disposition step (S1) to a pre-specified thickness (SL).

According to this method, it becomes possible to allow the thickness of the resin foam (5) provided between the inner surface (30F) of the slot (30) and the outer surface (40F) of the held-in-slot part (40) to become more uniform. Therefore, non-uniformity of fixing power of the coil (4) to the stator core (3) depending on the location can be further reduced. In addition, adjustment for obtaining an appropriate thickness of the resin foam (5) being after foaming can be easily performed in a state before the held-in-slot part (40) is held in the slot (30).

It is preferred that the method include, before the held-in-slot part disposition step (S4), a resin drying step (S3) of drying the resin foam (5) being before foaming applied in the resin disposition step (S1).

According to this method, the held-in-slot part (40) is held in the slot (30) after drying the resin foam (5) applied in the resin disposition step (S1), and thus, upon holding the held-in-slot part (40) in the slot (30), the resin foam (5) can be suppressed from peeling off or being scraped off due to contact with others. Therefore, non-uniformity of the thickness of the resin foam (5) between the inner surface (30F) of the slot (30) and the outer surface (40F) of the held-in-slot part (40) depending on the location can be further reduced.

In a rotating electrical machine stator (1) including a stator core (3) having a slot (30); and a coil (4) having a leg part (400) including a held-in-slot part (40) held in the slot (30) and a portion (41) extending from the held-in-slot part (40), a resin foam (5) including a thermal expansion material is provided between an inner surface (30F) of the slot (30) and an outer surface (40F) of the held-in-slot part (40) facing the inner surface (30F) of the slot (30), the coil (4) is formed by joining a plurality of segment conductors (4B) together, the leg parts (400) of the plurality of segment conductors (4B) each are provided with a joint part (43) that is joined to another one of the segment conductors (4B), and a conductive joint material (8) containing a metallic particle is disposed between a pair of the joint parts (43) facing each other.

According to this configuration, since a coil (4) is formed by joining a plurality of segment conductors (4B) together, joining together of a pair of joint parts (43) with a conductive joint material (8) can be performed using heating for foaming a resin foam (5). Therefore, an increase in the number of manufacturing steps for a rotating electrical machine stator (1) can be suppressed to a low level, enabling to implement the rotating electrical machine stator (1) with high productivity.

In addition, it is preferred that a distance between the inner surface (30F) of the slot (30) and the outer surface (40F) of the held-in-slot part (40) which are spaced apart from each other by the resin foam (5) be greater than or equal to a specified insulation distance (SD).

According to this configuration, in addition to fixing of the coil (4) to the stator core (3), securing of electrical insulation properties between the inner surface (30F) of the slot (30) and the outer surface (40F) of the held-in-slot part (40) can also be performed using the resin foam (5). By this, it also becomes possible to eliminate the need for an insulating sheet that is often disposed between the inner surface (30F) of the slot (30) and the outer surface (40F) of the held-in-slot part (40). When the insulating sheet is eliminated, a reduction in the number of components and a reduction in cost of the rotating electrical machine stator (1) become possible accordingly.

In addition, it is preferred that an entire region of the outer surface (40F) of the held-in-slot part (40) facing the inner surface (30F) of the slot (30) be covered by the resin foam (5).

According to this configuration, fixing of the coil (4) to the stator core (3) and securing of electrical insulation properties can be more highly reliably performed.

In addition, it is preferred that the slot (30) have an opening part (38) that opens toward a side of the slot (30) facing a rotating electrical machine rotor (2), and a portion of the outer surface (40F) of the held-in-slot part (40) facing the opening part (38) be covered by the resin foam (5).

According to this configuration, the entry of foreign matter into the slot (30) from the opening part (38) of the slot (30) can be restricted. Therefore, a reduction in electrical insulation properties between the stator core (3) and the coil (4) caused by such foreign matter can be suppressed.

In addition, it is preferred that the coil (4) have a coil end part (45) disposed outside the slot (30), and the resin foam (5) be provided between an outer surface (45AF) of a protruding portion (45A) of the coil end part (45) and an end surface (34F) of the stator core (3) facing the protruding portion (45A), the protruding portion (45A) protruding from the slot (30).

Even on the outside of the slot (30), securing of electrical insulation properties may be required for a region in which a protruding portion (45A) of a coil end part (45) and an end surface (34F) of the stator core (3) facing the protruding portion (45A) are disposed close to each other. According to this configuration, securing of electrical insulation properties in such a region can be appropriately performed.

In addition, it is preferred that a sheet member (50S) be disposed between the inner surface (30F) of the slot (30) and the outer surface (40F) of the held-in-slot part (40) facing the inner surface (30F) of the slot (30), and the resin foam (5, 50) be provided along at least one surface of the sheet member (50S).

According to this configuration, upon manufacturing the rotating electrical machine stator (1), a resin foam (5, 50) can be disposed together with a sheet member (50S), and thus, a configuration that facilitates disposition of the resin foam (5, 50) between the inner surface (30F) of the slot (30) and the outer surface (40F) of the held-in-slot part (40) is implemented.

INDUSTRIAL APPLICABILITY

A technique according to the present disclosure can be used for a rotating electrical machine stator and a method for manufacturing a rotating electrical machine stator.

REFERENCE SIGNS LIST

1: Rotating electrical machine stator, 2: Rotating electrical machine rotor, 3: Stator core, 4: Coil, 4B: Segment conductor, 5: Resin foam (sheet-like resin foam 5S), 8: Conductive joint material, 30: Slot, 30F: Inner surface (inner surface of the slot), 34F: Axial end surface (end surface of the stator core), 38: Opening part, 40: Held-in-slot part, 41: Extending part (portion extending from the held-in-slot part), 40F: Outer surface (outer surface of the held-in-slot part), 43: Joint part, 45: Coil end part, 45A: Protruding portion (protruding portion of the coil end part), 45AF: Outer surface (outer surface of the protruding portion), 50S: Sheet member, 50A: Overlapping part (overlapping portion), 400: Leg part, S1, S12: Resin disposition step, S2: Thickness adjustment step, S3: Resin drying step, S4, S13: Held-in-slot part disposition step, S14: Pressing step, S5, S15: Heating step, SD: Insulation distance, T1: Foaming temperature, T2: Joint temperature, X: Axial direction, Y: Radial direction, Y1: First radial side, Y2: Second radial side, Z: Circumferential direction, Z1: First circumferential side, and Z2: Second circumferential side

The invention claimed is:

1. A method for manufacturing a rotating electrical machine stator including a stator core having a slot; and a coil having a leg part including a held-in-slot part held in the slot and a portion extending from the held-in-slot part, wherein
the coil is formed by joining a plurality of segment conductors together,
the leg parts of the plurality of segment conductors each are provided with a joint part that is joined to another one of the segment conductors with a conductive joint material that joins by heating, and
the method comprises:
a resin disposition step of disposing a resin foam being before foaming on at least either one of an inner surface of the slot and an outer surface of the held-in-slot part facing the inner surface of the slot;
a held-in-slot part disposition step of disposing a plurality of the held-in-slot parts in the slot such that a pair of the joint parts to be joined together face each other and the conductive joint material is disposed between the pair of the joint parts facing each other; and
a heating step of heating the resin foam and the conductive joint material after the held-in-slot part disposition step, to foam the resin foam and join the pair of the joint parts together with the conductive joint material, wherein the pair of the joint parts and the conductive joint material are separate pieces of structure.

2. The method for manufacturing a rotating electrical machine stator according to claim 1, wherein
the conductive joint material is configured to join the pair of the joint parts together at a joint temperature higher than a foaming temperature at which the resin foam is foamed, and
in the heating step, the resin foam and the conductive joint material are heated by increasing a temperature to the joint temperature, using a single heating device.

3. The method for manufacturing a rotating electrical machine stator according to claim 1, wherein
the coil has a coil end part disposed outside the slot, and
the resin disposition step includes a step of disposing the resin foam being before foaming on at least either one of an outer surface of a protruding portion of the coil end part and an end surface of the stator core facing the protruding portion, the protruding portion protruding from the slot.

4. The method for manufacturing a rotating electrical machine stator according to claim 1, wherein the heating step is performed with movement of the pair of the joint parts in a direction in which the pair of the joint parts face each other restricted.

5. The method for manufacturing a rotating electrical machine stator according to claim 1, wherein as the resin foam being before foaming, a sheet-like resin foam integrally provided with a sheet member along at least one surface of the sheet member is used, and
the resin disposition step is performed before the held-in-slot part disposition step by disposing the sheet-like resin foam being before foaming along the inner surface of the slot.

6. The method for manufacturing a rotating electrical machine stator according to claim 5, wherein
after the held-in-slot part disposition step, the sheet-like resin foam is formed so as to enclose an entire circumference of the outer surface of the held-in-slot part, and both end parts of a portion of the sheet-like resin foam that encloses the entire circumference of the outer surface are allowed to overlap each other, and a pressing step of pressing at least a part of the overlapping portion is performed, and
the heating step is performed while a pressed state brought about in the pressing step is maintained.

7. The method for manufacturing a rotating electrical machine stator according to claim 1, wherein the resin disposition step is performed by applying the resin foam being before foaming to at least either one of the inner surface of the slot and the outer surface of the held-in-slot part facing the inner surface of the slot.

8. The method for manufacturing a rotating electrical machine stator according to claim 7, further comprising, before the held-in-slot part disposition step, a thickness adjustment step of adjusting a thickness of the resin foam being before foaming applied in the resin disposition step to a pre-specified thickness.

9. The method for manufacturing a rotating electrical machine stator according to claim 7, comprising, before the held-in-slot part disposition step, a resin drying step of drying the resin foam being before foaming applied in the resin disposition step.

10. A rotating electrical machine stator comprising: a stator core having a slot; and a coil having a leg part including a held-in-slot part held in the slot and a portion extending from the held-in-slot part, wherein
a resin foam including a thermal expansion material is provided between an inner surface of the slot and an outer surface of the held-in-slot part facing the inner surface of the slot,
the coil is formed by joining a plurality of segment conductors together,
the leg parts of the plurality of segment conductors each are provided with a joint part that is joined to another one of the segment conductors, and
a conductive joint material containing a metallic particle is disposed between a pair of the joint parts facing each other, wherein the pair of the joint parts and the conductive joint material are separate pieces of structure.

11. The rotating electrical machine stator according to claim 10, wherein a distance between the inner surface of the slot and the outer surface of the held-in-slot part is greater than or equal to a specified insulation distance, the inner surface and the outer surfaces being spaced apart from each other by the resin foam.

12. The rotating electrical machine stator according to claim 10, wherein an entire region of the outer surface of the held-in-slot part facing the inner surface of the slot is covered by the resin foam.

13. The rotating electrical machine stator according to claim 10, wherein
   the slot has an opening part that opens toward a side of the slot facing a rotating electrical machine rotor, and
   a portion of the outer surface of the held-in-slot part facing the opening part is covered by the resin foam.

14. The rotating electrical machine stator according to claim 10, wherein
   the coil has a coil end part disposed outside the slot, and
   the resin foam is provided between an outer surface of a protruding portion of the coil end part and an end surface of the stator core facing the protruding portion, the protruding portion protruding from the slot.

15. The rotating electrical machine stator according to claim 10, wherein
   a sheet member is disposed between the inner surface of the slot and the outer surface of the held-in-slot part facing the inner surface of the slot, and
   the resin foam is provided along at least one surface of the sheet member.

\* \* \* \* \*